United States Patent
Dubelman et al.

(10) Patent No.: US 11,826,950 B2
(45) Date of Patent: Nov. 28, 2023

(54) RESIN MANAGEMENT SYSTEM FOR ADDITIVE MANUFACTURING

(71) Applicants: General Electric Company, Schenectady, NY (US); Unison Industries, LLC, Jacksonville, FL (US)

(72) Inventors: Meredith Elissa Dubelman, Liberty Township, OH (US); Trent William Muhlenkamp, Cincinnati, OH (US); Kevin Robert Dickson, Dayton, OH (US); Christopher David Barnhill, Cincinnati, OH (US); Brian Thomas Thompson, Loveland, OH (US)

(73) Assignees: General Electric Company, Schenectady, NY (US); Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 17/371,484

(22) Filed: Jul. 9, 2021

(65) Prior Publication Data

US 2023/0012168 A1   Jan. 12, 2023

(51) Int. Cl.
*B29C 64/205* (2017.01)
*B29C 64/124* (2017.01)
(Continued)

(52) U.S. Cl.
CPC .......... *B29C 64/124* (2017.08); *B29C 64/214* (2017.08); *B29C 64/232* (2017.08);
(Continued)

(58) Field of Classification Search
CPC ... B29C 64/124; B29C 64/129; B29C 64/135; B29C 64/321; B29C 64/329; B29C 64/393; B33Y 10/00; B33Y 30/00; B33Y 50/02
See application file for complete search history.

(56) References Cited

U.S. PATENT DOCUMENTS 1,990,749 A   2/1935   Phillips et al.
2,259,517 A   10/1941  Drenkard, Jr.
(Continued)

FOREIGN PATENT DOCUMENTS

CN   101628477 A   1/2010
CN   103210344 A   7/2013
(Continued)

OTHER PUBLICATIONS

ADMATEC, Admaflex 300 DLP 3D Printer, Specifications, Features, Design and Functions, Netherlands, 2 Pages. Retrieved Nov. 5, 2020 from Webpage: https://admateceurope.com/files/10f1a369c2239943e6506f27ba920bd4dd9359078e744369695ab6ffbde75c6c?filename=Admaflex%20300%20brochure.pdf&sig=hQyDlzxkSmFOZwjM.
(Continued)

*Primary Examiner* — Joseph S Del Sole
*Assistant Examiner* — Jamel M Nelson
(74) *Attorney, Agent, or Firm* — Dority & Manning, P.A.

(57) ABSTRACT

An additive manufacturing apparatus includes a stage configured to hold a component. A radiant energy device is operable to generate and project radiant energy in a patterned image. An actuator is configured to change a relative position of the stage relative to the radiant energy device. A resin management system includes a material deposition assembly upstream configured to deposit a resin on a resin support. The material deposition assembly includes a reservoir configured to retain a first volume of the resin and define a thickness of the resin on the resin support as the resin support is translated in an X-axis direction. The material deposition assembly further includes a vessel positioned above the reservoir in a Z-axis direction and configured to store a second volume of the resin. In addition, the
(Continued)

material deposition assembly includes a conduit configured to direct the resin from the vessel to the reservoir.

11 Claims, 15 Drawing Sheets

(51) Int. Cl.
  *B33Y 10/00* (2015.01)
  *B33Y 30/00* (2015.01)
  *B33Y 50/02* (2015.01)
  *B29C 64/214* (2017.01)
  *B29C 64/264* (2017.01)
  *B29C 64/232* (2017.01)
  *B29C 64/245* (2017.01)
  *B29C 64/255* (2017.01)
  *B29C 64/393* (2017.01)
  *B29C 64/241* (2017.01)

(52) U.S. Cl.
  CPC .......... *B29C 64/241* (2017.08); *B29C 64/245* (2017.08); *B29C 64/255* (2017.08); *B29C 64/264* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 3,264,103 A | 8/1966 | Cohen et al. |
| 3,395,014 A | 7/1968 | Cohen et al. |
| 3,486,482 A | 12/1969 | Hunger |
| 3,710,846 A | 1/1973 | Properzi |
| 3,875,067 A | 4/1975 | DeSorgo et al. |
| 3,991,149 A | 11/1976 | Hurwitt |
| 4,041,476 A | 8/1977 | Swainson |
| 4,292,827 A | 10/1981 | Waugh |
| 4,575,330 A | 3/1986 | Hull |
| 4,752,498 A | 6/1988 | Fudim |
| 4,945,032 A | 7/1990 | Murphy et al. |
| 5,015,312 A | 5/1991 | Kinzie |
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,088,047 A | 2/1992 | Bynum |
| 5,094,935 A | 3/1992 | Vassiliou et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,162,167 A | 11/1992 | Minh et al. |
| 5,174,931 A | 12/1992 | Almquist et al. |
| 5,175,077 A | 12/1992 | Grossa |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,326 A | 8/1993 | Grossa |
| 5,236,637 A | 8/1993 | Hull |
| 5,236,812 A | 8/1993 | Vassiliou et al. |
| 5,247,180 A | 9/1993 | Mitcham et al. |
| 5,248,456 A | 9/1993 | Evans, Jr. et al. |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,460,758 A | 10/1995 | Langer et al. |
| 5,496,682 A | 3/1996 | Quadir et al. |
| 5,610,824 A | 3/1997 | Vinson et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,688,464 A | 11/1997 | Jacobs et al. |
| 5,693,144 A | 12/1997 | Jacobs et al. |
| 5,697,043 A | 12/1997 | Baskaran et al. |
| 5,717,599 A | 2/1998 | Menhennett et al. |
| 5,718,279 A | 2/1998 | Satoh et al. |
| 5,746,833 A | 5/1998 | Gerhardt |
| 5,764,521 A | 6/1998 | Batchelder et al. |
| 5,807,437 A | 9/1998 | Sachs et al. |
| 5,824,184 A | 10/1998 | Kamijo et al. |
| 5,851,465 A | 12/1998 | Bredt |
| 5,866,058 A | 2/1999 | Batchelder et al. |
| 5,895,547 A | 4/1999 | Kathrein et al. |
| 5,900,207 A | 5/1999 | Danforth et al. |
| 5,939,008 A | 8/1999 | Comb et al. |
| 5,940,674 A | 8/1999 | Sachs et al. |
| 5,945,058 A | 8/1999 | Manners et al. |
| 5,968,561 A | 10/1999 | Batchelder et al. |
| 5,980,813 A | 11/1999 | Narang et al. |
| 5,985,204 A | 11/1999 | Otsuka et al. |
| 6,051,179 A | 4/2000 | Hagenau |
| 6,067,480 A | 5/2000 | Stuffle et al. |
| 6,068,367 A | 5/2000 | Fabbri |
| 6,110,411 A | 8/2000 | Clausen et al. |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson, Jr. et al. |
| 6,375,451 B1 | 4/2002 | Robinson et al. |
| 6,376,148 B1 | 4/2002 | Liu et al. |
| 6,391,245 B1 | 5/2002 | Smith |
| 6,399,010 B1 | 6/2002 | Guertin et al. |
| 6,401,002 B1 | 6/2002 | Jang et al. |
| 6,403,002 B1 | 6/2002 | van der Geest |
| 6,436,520 B1 | 8/2002 | Yamamoto |
| 6,450,393 B1 | 9/2002 | Doumanidis et al. |
| 6,463,349 B2 | 10/2002 | White et al. |
| 6,471,800 B2 | 10/2002 | Jang et al. |
| 6,500,378 B1 | 12/2002 | Smith |
| 6,512,869 B1 | 1/2003 | Imayama et al. |
| 6,543,506 B1 | 4/2003 | Phillips |
| 6,575,218 B1 | 6/2003 | Burns et al. |
| 6,596,224 B1 | 7/2003 | Sachs et al. |
| 6,641,897 B2 | 11/2003 | Gervasi |
| 6,649,113 B1 | 11/2003 | Manners et al. |
| 6,660,209 B2 | 12/2003 | Leyden et al. |
| 6,668,892 B2 | 12/2003 | Vasilakes et al. |
| 6,682,598 B1 | 1/2004 | Steinmueller et al. |
| 6,780,368 B2 | 8/2004 | Liu et al. |
| 6,786,711 B2 | 9/2004 | Koch et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,914,406 B1 | 7/2005 | Wilkes et al. |
| 6,930,144 B2 | 8/2005 | Oriakhi |
| 6,947,058 B1 | 9/2005 | Elmquist |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,016,738 B1 | 3/2006 | Karunasiri |
| 7,022,207 B2 | 4/2006 | Hirsch |
| 7,045,738 B1 | 5/2006 | Kovacevic et al. |
| 7,052,263 B2 | 5/2006 | John |
| 7,070,250 B2 | 7/2006 | Lester et al. |
| 7,074,029 B2 | 7/2006 | Stockwell et al. |
| 7,084,875 B2 | 8/2006 | Plante |
| 7,087,109 B2 | 8/2006 | Bredt et al. |
| 7,158,849 B2 | 1/2007 | Huang et al. |
| 7,164,420 B2 | 1/2007 | Ard |
| 7,195,472 B2 | 3/2007 | John |
| 7,261,542 B2 | 8/2007 | Hickerson et al. |

(56) References Cited

U.S. PATENT DOCUMENTS

| | | |
|---|---|---|
| 7,270,528 B2 | 9/2007 | Sherwood |
| 7,300,613 B2 | 11/2007 | Sano et al. |
| 7,351,304 B2 | 4/2008 | Liang et al. |
| 7,402,219 B2 | 7/2008 | Graf |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,555,726 B2 | 6/2009 | Kurtenbach et al. |
| 7,569,174 B2 | 8/2009 | Ruatta et al. |
| 7,572,403 B2 | 8/2009 | Gu et al. |
| 7,575,682 B2 | 8/2009 | Olsta et al. |
| 7,578,958 B2 | 8/2009 | Patel et al. |
| 7,614,866 B2 | 11/2009 | Sperry et al. |
| 7,614,886 B2 | 11/2009 | Sperry et al. |
| 7,636,610 B2 | 12/2009 | Schillen et al. |
| 7,698,947 B2 | 4/2010 | Sarr |
| 7,706,910 B2 | 4/2010 | Hull et al. |
| 7,742,060 B2 | 6/2010 | Maillot |
| 7,758,799 B2 | 7/2010 | Hull et al. |
| 7,767,132 B2 | 8/2010 | Patel et al. |
| 7,771,183 B2 | 8/2010 | Hull et al. |
| 7,780,429 B2 | 8/2010 | Kikuchi |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,845,930 B2 | 12/2010 | Shkolnik et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 7,931,460 B2 | 4/2011 | Scott et al. |
| 7,962,238 B2 | 6/2011 | Shkolnik et al. |
| 7,964,047 B2 | 6/2011 | Ishida |
| 7,995,073 B1 | 8/2011 | Shemanarev et al. |
| 8,003,040 B2 | 8/2011 | El-Siblani |
| 8,071,055 B2 | 9/2011 | Davidson et al. |
| 8,029,642 B2 | 10/2011 | Hagman |
| 8,048,261 B2 | 11/2011 | McCowin |
| 8,070,473 B2 | 12/2011 | Kozlak |
| 8,096,262 B2 | 1/2012 | Ederer et al. |
| 8,105,066 B2 | 1/2012 | Sperry et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,191,500 B2 | 6/2012 | Dohring et al. |
| 8,211,226 B2 | 7/2012 | Bredt et al. |
| 8,232,444 B2 | 7/2012 | Bar Nathan et al. |
| 8,259,103 B2 | 9/2012 | Glueck et al. |
| 8,269,767 B2 | 9/2012 | Glueck et al. |
| 8,282,866 B2 | 10/2012 | Hiraide |
| 8,326,024 B2 | 12/2012 | Shkolnik et al. |
| 8,372,330 B2 | 2/2013 | El-Siblani et al. |
| 8,394,313 B2 | 3/2013 | El-Siblani et al. |
| 8,413,578 B2 | 4/2013 | Doyle |
| 8,424,580 B2 | 4/2013 | Anderson et al. |
| 8,444,903 B2 | 5/2013 | Lyons et al. |
| 8,454,879 B2 | 6/2013 | Kuzusako et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,513,562 B2 | 8/2013 | Bichsel |
| 8,522,159 B2 | 8/2013 | Kurtenbach et al. |
| 8,540,501 B2 | 9/2013 | Yasukochi |
| 8,568,646 B2 | 10/2013 | Wang et al. |
| 8,568,649 B1 | 10/2013 | Balistreri et al. |
| 8,593,083 B2 | 11/2013 | Firhoj et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,658,076 B2 | 2/2014 | El-Siblani |
| 8,663,568 B2 | 3/2014 | Bar Nathan et al. |
| 8,666,142 B2 | 3/2014 | Shkolnik et al. |
| 8,703,037 B2 | 4/2014 | Hull et al. |
| 8,715,832 B2 | 5/2014 | Ederer et al. |
| 8,718,522 B2 | 5/2014 | Chillscyzn et al. |
| 8,737,862 B2 | 5/2014 | Manico et al. |
| 8,741,194 B1 | 6/2014 | Ederer et al. |
| 8,741,203 B2 | 6/2014 | Liska et al. |
| 8,744,184 B2 | 6/2014 | Ameline et al. |
| 8,761,918 B2 | 6/2014 | Silverbrook |
| 8,801,418 B2 | 8/2014 | El-Siblani et al. |
| 8,805,064 B2 | 8/2014 | Ameline et al. |
| 8,815,143 B2 | 8/2014 | John et al. |
| 8,844,133 B2 | 9/2014 | Fuller |
| 8,845,316 B2 | 9/2014 | Schillen et al. |
| 8,845,953 B1 | 9/2014 | Balistreri et al. |
| 8,862,260 B2 | 10/2014 | Shkolnik et al. |
| 8,872,024 B2 | 10/2014 | Jamar et al. |
| 8,873,024 B2 | 10/2014 | Jamar et al. |
| 8,876,513 B2 | 11/2014 | Lim et al. |
| 8,877,115 B2 | 11/2014 | Elsey |
| 8,888,480 B2 | 11/2014 | Yoo et al. |
| 8,915,728 B2 | 12/2014 | Mironets et al. |
| 8,926,304 B1 | 1/2015 | Chen |
| 8,932,511 B2 | 1/2015 | Napadensky |
| 8,968,625 B2 | 3/2015 | Tan |
| 8,974,717 B2 | 3/2015 | Maguire et al. |
| 8,991,211 B1 | 3/2015 | Arlotti et al. |
| 8,992,816 B2 | 3/2015 | Jonasson et al. |
| 8,998,601 B2 | 4/2015 | Busato |
| 9,011,982 B2 | 4/2015 | Muller et al. |
| 9,031,680 B2 | 5/2015 | Napadensky |
| 9,063,376 B2 | 6/2015 | Mizumura |
| 9,064,922 B2 | 6/2015 | Nakajima et al. |
| 9,067,359 B2 | 6/2015 | Rohner et al. |
| 9,067,360 B2 | 6/2015 | Wehning et al. |
| 9,067,361 B2 | 6/2015 | El-Siblani |
| 9,073,260 B2 | 7/2015 | El-Siblani et al. |
| 9,079,357 B2 | 7/2015 | Ebert et al. |
| 9,101,321 B1 | 8/2015 | Kieser |
| 9,149,986 B2 | 10/2015 | Huang et al. |
| 9,150,032 B2 | 10/2015 | Roof et al. |
| 9,153,052 B2 | 10/2015 | Ameline et al. |
| 9,159,155 B2 | 10/2015 | Andersen |
| 9,186,847 B2 | 11/2015 | Fruth et al. |
| 9,193,112 B2 | 11/2015 | Ohkusa et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,221,100 B2 | 12/2015 | Schwarze et al. |
| 9,233,504 B2 | 1/2016 | Douglas et al. |
| 9,248,600 B2 | 2/2016 | Goodman et al. |
| 9,259,880 B2 | 2/2016 | Chen |
| 9,308,690 B2 | 4/2016 | Boyer et al. |
| 9,327,385 B2 | 5/2016 | Webb et al. |
| 9,346,217 B2 | 5/2016 | Huang et al. |
| 9,346,218 B2 | 5/2016 | Chen et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,443 B2 | 8/2016 | Ljungblad et al. |
| 9,415,544 B2 | 8/2016 | Kerekes et al. |
| 9,415,547 B2 | 8/2016 | Chen et al. |
| 9,429,104 B2 | 8/2016 | Fuller |
| 9,434,107 B2 | 9/2016 | Zenere |
| 9,446,557 B2 | 9/2016 | Zenere et al. |
| 9,453,142 B2 | 9/2016 | Rolland et al. |
| 9,456,884 B2 | 10/2016 | Uckelmann et al. |
| 9,457,374 B2 | 10/2016 | Hibbs et al. |
| 9,463,488 B2 | 10/2016 | Ederer et al. |
| 9,469,074 B2 | 10/2016 | Ederer et al. |
| 9,486,944 B2 | 11/2016 | El-Siblani et al. |
| 9,486,964 B2 | 11/2016 | Joyce |
| 9,487,443 B2 | 11/2016 | Watanabe |
| 9,498,920 B2 | 11/2016 | DeSimone et al. |
| 9,498,921 B2 | 11/2016 | Teulet |
| 9,511,546 B2 | 12/2016 | Chen et al. |
| 9,517,591 B2 | 12/2016 | Yoo et al. |
| 9,517,592 B2 | 12/2016 | Yoo et al. |

(56) References Cited

U.S. PATENT DOCUMENTS

| | | |
|---|---|---|
| 9,527,244 B2 | 12/2016 | El-Siblani |
| 9,527,272 B2 | 12/2016 | Steele |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,545,784 B2 | 1/2017 | Nakamura |
| 9,550,326 B2 | 1/2017 | Costabeber |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,582 B2 | 2/2017 | Okamoto |
| 9,581,530 B2 | 2/2017 | Guthrie et al. |
| 9,592,635 B2 | 3/2017 | Ebert et al. |
| 9,604,411 B2 | 3/2017 | Rogren |
| 9,610,616 B2 | 4/2017 | Chen et al. |
| 9,616,620 B2 | 4/2017 | Hoechsmann et al. |
| 9,632,037 B2 | 4/2017 | Chen et al. |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,656,344 B2 | 5/2017 | Kironn et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 9,688,027 B2 | 6/2017 | Batchelder et al. |
| 9,707,720 B2 | 7/2017 | Chen et al. |
| 9,720,363 B2 | 8/2017 | Chillscyzn et al. |
| 9,738,034 B2 | 8/2017 | Gruber et al. |
| 9,738,564 B2 | 8/2017 | Capobianco et al. |
| 9,751,292 B2 | 9/2017 | Jamar et al. |
| 9,764,513 B2 | 9/2017 | Stampfl et al. |
| 9,764,535 B2 | 9/2017 | Xie et al. |
| 9,821,546 B2 | 11/2017 | Schaafsma et al. |
| 9,862,146 B2 | 1/2018 | Driessen et al. |
| 9,862,150 B2 | 1/2018 | Chen et al. |
| 9,868,255 B2 | 1/2018 | Comb et al. |
| 9,885,987 B2 | 2/2018 | Chillscyzn et al. |
| 9,895,843 B2 | 2/2018 | Lobovsky et al. |
| 9,901,983 B2 | 2/2018 | Hovel et al. |
| 9,908,293 B2 | 3/2018 | Yoo et al. |
| 9,919,474 B2 | 3/2018 | Napadensky |
| 9,919,515 B2 | 3/2018 | Daniell et al. |
| 9,950,368 B2 | 4/2018 | Lampenscherf et al. |
| 9,956,727 B2 | 5/2018 | Steele |
| 9,962,767 B2 | 5/2018 | Buller et al. |
| 9,981,411 B2 | 5/2018 | Green et al. |
| 10,000,023 B2 | 6/2018 | El-Siblani et al. |
| 10,011,076 B2 | 7/2018 | El-Siblani et al. |
| 10,061,302 B2 | 8/2018 | Jacobs et al. |
| 10,071,422 B2 | 9/2018 | Buller et al. |
| 10,124,532 B2 | 11/2018 | El-Siblani et al. |
| 10,150,254 B2 | 12/2018 | Bauman et al. |
| 10,155,345 B2 | 12/2018 | Ermoshkin et al. |
| 10,155,882 B2 | 12/2018 | Rolland et al. |
| 10,183,330 B2 | 1/2019 | Buller et al. |
| 10,183,444 B2 | 1/2019 | Campbell |
| 10,240,066 B2 | 3/2019 | Rolland et al. |
| 10,245,784 B2 | 4/2019 | Teken et al. |
| 10,317,882 B2 | 6/2019 | de Pena et al. |
| 10,336,055 B2 | 7/2019 | Das et al. |
| 10,336,057 B2 | 7/2019 | Moore et al. |
| 10,350,823 B2 | 7/2019 | Rolland et al. |
| 10,357,956 B2 | 7/2019 | Usami et al. |
| 10,406,748 B2 | 9/2019 | Honda |
| 10,612,112 B2 | 4/2020 | Yang et al. |
| 10,639,843 B2 | 5/2020 | Yuan et al. |
| 10,682,808 B2 | 6/2020 | Fujita et al. |
| 10,695,988 B2 | 6/2020 | Hanyu et al. |
| 10,717,212 B2 | 7/2020 | Parkinson et al. |
| 10,737,479 B2 | 8/2020 | El-Siblani et al. |
| 2002/0164069 A1 | 11/2002 | Nagano et al. |
| 2003/0180171 A1 | 9/2003 | Artz et al. |
| 2003/0209836 A1 | 11/2003 | Sherwood |
| 2005/0012239 A1 | 1/2005 | Nakashima |
| 2005/0019016 A1 | 9/2005 | Ishikawa et al. |
| 2006/0230984 A1 | 10/2006 | Bredt et al. |
| 2006/0248062 A1 | 11/2006 | Libes et al. |
| 2007/0063366 A1 | 3/2007 | Cunningham et al. |
| 2007/0116937 A1 | 5/2007 | Lazzerini |
| 2008/0170112 A1 | 7/2008 | Hull et al. |
| 2008/0224352 A1 | 9/2008 | Narukawa et al. |
| 2008/0241404 A1 | 10/2008 | Allaman et al. |
| 2010/0003619 A1 | 1/2010 | Das et al. |
| 2010/0196694 A1 | 8/2010 | Yamazaki et al. |
| 2010/0290016 A1 | 11/2010 | Kaehr et al. |
| 2011/0089610 A1 | 4/2011 | El-Siblani et al. |
| 2011/0101570 A1 | 5/2011 | John et al. |
| 2011/0162989 A1 | 7/2011 | Ducker et al. |
| 2011/0207057 A1 | 8/2011 | Hull et al. |
| 2012/0195994 A1 | 8/2012 | El-Siblani et al. |
| 2012/0292800 A1 | 11/2012 | Higuchi et al. |
| 2013/0008879 A1 | 1/2013 | Bichsel |
| 2013/0140741 A1 | 6/2013 | El-Siblani et al. |
| 2014/0099476 A1 | 4/2014 | Subramanian et al. |
| 2014/0103581 A1 | 4/2014 | Das et al. |
| 2014/0200865 A1 | 7/2014 | Lehmann et al. |
| 2014/0239554 A1 | 8/2014 | El-Siblani et al. |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2014/0332507 A1 | 11/2014 | Fockele |
| 2014/0339741 A1 | 11/2014 | Aghababaie et al. |
| 2014/0348691 A1 | 11/2014 | Ljungblad et al. |
| 2014/0348692 A1 | 11/2014 | Bessac et al. |
| 2015/0004042 A1 | 1/2015 | Nimal |
| 2015/0004046 A1 | 1/2015 | Graham et al. |
| 2015/0056365 A1 | 2/2015 | Miyoshi |
| 2015/0086409 A1 | 3/2015 | Hellestam |
| 2015/0102531 A1 | 4/2015 | El-Siblani et al. |
| 2015/0104563 A1 | 4/2015 | Lowe et al. |
| 2015/0140152 A1 | 5/2015 | Chen |
| 2015/0140155 A1 | 5/2015 | Ohno et al. |
| 2015/0145174 A1 | 5/2015 | Comb |
| 2015/0158111 A1 | 6/2015 | Schwarze et al. |
| 2015/0165695 A1 | 6/2015 | Chen et al. |
| 2015/0210013 A1 | 7/2015 | Teulet |
| 2015/0224710 A1 | 8/2015 | El-Siblani |
| 2015/0231828 A1 | 8/2015 | El-Siblani et al. |
| 2015/0231831 A1 | 8/2015 | El-Siblani |
| 2015/0246487 A1 | 9/2015 | El-Siblani |
| 2015/0251351 A1 | 9/2015 | Feygin |
| 2015/0268099 A1 | 9/2015 | Craig et al. |
| 2015/0298396 A1 | 10/2015 | Chen et al. |
| 2015/0301517 A1 | 10/2015 | Chen et al. |
| 2015/0306819 A1 | 10/2015 | Ljungblad |
| 2015/0306825 A1 | 10/2015 | Chen et al. |
| 2015/0321421 A1 | 11/2015 | Ding |
| 2015/0352668 A1 | 12/2015 | Scott et al. |
| 2015/0352791 A1 | 12/2015 | Chen et al. |
| 2015/0355553 A1 | 12/2015 | Allanic |
| 2015/0375452 A1 | 12/2015 | Huang et al. |
| 2016/0016361 A1 | 1/2016 | Lobovsky et al. |
| 2016/0031010 A1 | 2/2016 | O'Neill et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0059484 A1 | 3/2016 | DeSimone et al. |
| 2016/0059485 A1 | 3/2016 | Ding et al. |
| 2016/0067921 A1 | 3/2016 | Willis et al. |
| 2016/0082662 A1 | 3/2016 | Majer |
| 2016/0082671 A1 | 3/2016 | Joyce |
| 2016/0096332 A1 | 4/2016 | Chen et al. |
| 2016/0107340 A1 | 4/2016 | Joyce |
| 2016/0107383 A1 | 4/2016 | Dikovsky et al. |
| 2016/0107387 A1 | 4/2016 | Ooba et al. |
| 2016/0129631 A1 | 5/2016 | Chen et al. |
| 2016/0137839 A1 | 5/2016 | Rolland et al. |
| 2016/0167160 A1 | 6/2016 | Hellestam |
| 2016/0176114 A1 | 6/2016 | Tsai et al. |

(56) References Cited

U.S. PATENT DOCUMENTS

| | | |
|---|---|---|
| 2016/0184931 A1 | 6/2016 | Green |
| 2016/0193785 A1 | 7/2016 | Bell et al. |
| 2016/0214327 A1 | 7/2016 | Uckelmann et al. |
| 2016/0221262 A1 | 8/2016 | Das et al. |
| 2016/0223117 A1* | 8/2016 | Hitzelberger ......... F16L 55/027 |
| 2016/0243649 A1 | 8/2016 | Zheng et al. |
| 2016/0303798 A1 | 10/2016 | Mironets et al. |
| 2016/0332386 A1 | 11/2016 | Kuijpers |
| 2016/0361871 A1 | 12/2016 | Jeng et al. |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chen et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157841 A1 | 6/2017 | Green |
| 2017/0157862 A1 | 6/2017 | Bauer |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0305136 A1 | 10/2017 | Elsey |
| 2017/0326786 A1 | 11/2017 | Yuan et al. |
| 2017/0326807 A1 | 11/2017 | Greene et al. |
| 2017/0368816 A1 | 12/2017 | Batchelder et al. |
| 2018/0001567 A1 | 1/2018 | Juan et al. |
| 2018/0015672 A1 | 1/2018 | Shusteff et al. |
| 2018/0043619 A1 | 2/2018 | Kim et al. |
| 2018/0056585 A1 | 3/2018 | Du Toit |
| 2018/0056604 A1 | 3/2018 | Sands et al. |
| 2018/0079137 A1 | 3/2018 | Herzog et al. |
| 2018/0085998 A1 | 3/2018 | von Burg |
| 2018/0117790 A1 | 5/2018 | Yun |
| 2018/0134029 A1* | 5/2018 | Myerberg ............... B22F 10/12 |
| 2018/0169969 A1 | 6/2018 | Deleon et al. |
| 2018/0200948 A1 | 7/2018 | Kuijpers et al. |
| 2018/0201021 A1 | 7/2018 | Beaver et al. |
| 2018/0229332 A1 | 8/2018 | Tsai et al. |
| 2018/0229436 A1 | 8/2018 | Gu et al. |
| 2018/0272603 A1 | 9/2018 | MacCormack et al. |
| 2018/0272608 A1 | 9/2018 | Yun |
| 2018/0345600 A1 | 12/2018 | Holford et al. |
| 2018/0370214 A1 | 12/2018 | Comb et al. |
| 2019/0022937 A1 | 1/2019 | Stelter et al. |
| 2019/0039299 A1 | 2/2019 | Busbee et al. |
| 2019/0047211 A1 | 2/2019 | Herring et al. |
| 2019/0061230 A1 | 2/2019 | Ermoshkin et al. |
| 2019/0112499 A1 | 4/2019 | Rolland et al. |
| 2019/0126533 A1 | 5/2019 | Thompson |
| 2019/0126548 A1 | 5/2019 | Barnhart et al. |
| 2019/0232550 A1 | 8/2019 | Mark et al. |
| 2019/0240932 A1 | 8/2019 | Graf |
| 2019/0263054 A1 | 8/2019 | Kotler et al. |
| 2019/0283316 A1 | 9/2019 | Rolland et al. |
| 2019/0299524 A1 | 10/2019 | Hill et al. |
| 2019/0344381 A1 | 11/2019 | Pomerantz et al. |
| 2019/0389137 A1 | 12/2019 | Frohnmaier et al. |
| 2020/0001398 A1 | 1/2020 | Mellor et al. |
| 2020/0079008 A1 | 3/2020 | Chowdry et al. |
| 2020/0079017 A1 | 3/2020 | MacNeish, III et al. |
| 2020/0101564 A1* | 4/2020 | Shibazaki ............... B33Y 40/00 |
| 2020/0108553 A1 | 4/2020 | Rogren |
| 2020/0164437 A1 | 5/2020 | Goth et al. |
| 2020/0198224 A1* | 6/2020 | Dubelman ............ B29C 64/129 |
| 2020/0230938 A1 | 7/2020 | Menchik et al. |
| 2020/0247040 A1 | 8/2020 | Green |
| 2020/0262150 A1* | 8/2020 | Dubelman ............ B29C 64/268 |
| 2020/0290275 A1 | 9/2020 | Dubelman et al. |
| 2020/0307075 A1 | 10/2020 | Mattes et al. |
| 2020/0376775 A1 | 12/2020 | Das et al. |
| 2021/0046695 A1 | 2/2021 | Thompson et al. |

FOREIGN PATENT DOCUMENTS

| | | |
|---|---|---|
| CN | 103522546 A | 1/2014 |
| CN | 104175559 A | 12/2014 |
| CN | 104647752 A | 5/2015 |
| CN | 105711101 A | 6/2016 |
| CN | 105773962 A | 7/2016 |
| CN | 107322930 A | 11/2017 |
| CN | 208946717 U | 6/2019 |
| CN | 109968661 A | 7/2019 |
| CN | 111497231 A | 8/2020 |
| DE | 102007010624 A1 | 9/2008 |
| EP | 448459 A1 | 9/1991 |
| EP | 557051 A1 | 8/1993 |
| EP | 1454831 B1 | 9/2004 |
| EP | 1852244 A2 | 11/2007 |
| EP | 1864785 A1 | 12/2007 |
| EP | 1946908 A2 | 7/2008 |
| EP | 2521524 A1 | 11/2012 |
| EP | 3053729 A1 | 8/2016 |
| EP | 3453521 A1 | 3/2019 |
| EP | 3356121 B1 | 10/2020 |
| GB | 2311960 A | 10/1997 |
| JP | H06246839 A | 9/1994 |
| JP | 2002370286 A | 12/2002 |
| JP | 2003039564 A | 2/2003 |
| JP | 2004/257929 A | 9/2004 |
| JP | 2016196098 A | 11/2016 |
| KR | 20170108729 A | 9/2017 |
| KR | 102109664 B1 | 5/2020 |
| WO | WO9600422 A1 | 1/1996 |
| WO | WO9806560 | 2/1998 |
| WO | WO0100390 A1 | 1/2001 |
| WO | WO2006/077665 A1 | 7/2006 |
| WO | WO2006109355 A1 | 10/2006 |
| WO | WO2017009368 A1 | 1/2017 |
| WO | WO2017098968 A1 | 6/2017 |
| WO | WO2017100538 A1 | 6/2017 |
| WO | WO2019/159936 A1 | 8/2019 |
| WO | WO2020033607 A1 | 2/2020 |
| WO | WO202018553 A1 | 9/2020 |

OTHER PUBLICATIONS

Carbon, Carbon SpeedCell: Additive Manufacturing Reinvented, Redwood City California, Mar. 16, 2017, 4 Pages. Retrieved from Webpage: https://www.carbon3d.com/news/carbon-speedcell-additive-manufacturing-reinvented/.

Carbon, The 3D Printer for Products that Outperform, 8 Pages. Retrieved from Webpage: https://www.carbon3d.com.

DDM Systems, Disruptive Technologies for Additive Manufacturing, 2014. Retrieved on Jul. 7, 2020 from Web Link: http://www.ddmsys.com/.

(56) References Cited

OTHER PUBLICATIONS

Designing Buildings Wiki, Types of Brick Bonding, 6 Pages. Retrieved Mar. 25, 2021 from Webpage: https://www.designingbuildings.co.uk/wiki/Types_of_brick_bonding.

Doctor Blade with Micrometer Screw Gauge, The Tape Casting Warehouse, Inc., Morrisville PA, 6 Pages. Retrieved Mar. 23, 2021 from Webpage: https://www.drblade.com/.

Envisiontec, Advanced DLP for Superior 3D Printing, Mar. 9, 2017, 8 Pages. https://envisiontec.com/wp-content/uploads/2016/12/Why-EnvisionTEC-DLP-3D-Printing-is-Better-rebranded.pdf.

Feng et al., Exposure Reciprocity Law in Photopolymerization of Multi-Functional Acrylates and Methacrylates, Macromolecular Chemistry and Physics, vol. 208, 2007, pp. 295-306.

Formlabs, An Introduction to Post-Curing SLA 3D Prints, 8 Pages. Retrieved from Webpage: https://formlabs.com/blog/introduction-post-curing-sla-3d-prints.

Formlabs, Form Wash & Form Cure, 8 Pages. Retrieved from Webpage: https://formlabs.com/tools/wash-cure/.

Hafkamp et al., A Feasibility Study on Process Monitoring and Control in Vat Photopolymerization of Ceramics, Mechatronics, vol. 56, The Netherlands, Dec. 2018, pp. 220-241. Retrieved from https://doi.org/10.1016/j.mechatronics.2018.02.006.

KUDO3D, Post-Process Your SLA Prints in 4 Easy Steps, 8 Pages. Retrieved from Webpage: https://www.kudo3d.com/post-process-your-sla-prints-in-4-easy-steps/.

Leap, Low-Frequency Sonic Mixing Technology, Energy Efficiency & Renewable Energy, Energy.Gov, 5 Pages. Retrieved Mar. 17, 2021 from Webpage: https://www.energy.gov/cere/amo/low-frequency-sonic-mixing-technology.

Lee et al., Development of a 3D Printer Using Scanning Projection Stereolithography, Scientific Reports, vol. 5, Article No. 9875, 2015, 5 pages. https://www.nature.com/articles/srep09875#s1.

Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.

Limaye, Multi-Objective Process Planning Method for Mask Projection Stereolithography, Dissertation Georgia Institute of Technology, Dec. 2007, 324 Pages.

Lithoz, 2 Pages. Retrieved from Webpage: http://www.lithoz.com/en/our-products/cleaning-station.

Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.

MICRON3D, Cleaning of Printed Models, YouTube, Dec. 5, 2016, 1 Page. Retrieved from Webpage: https://www.youtube.com/watch?v=soAIrSsliBY.

Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa Florida.

Omegasonics, Ultrasonic Cleaning of 3D Printer Parts, YouTube, Feb. 26, 2014, 1 Page. Retrieved from Webpage: https://www.youtube.com/watch?v=Gxj47OS5ohk.

Park et al., Development of Multi-Material DLP 3D Printer, Journal of the Korean Society of Manufacturing Technology Engineers, vol. 26, Issue 1, Seoul Korea, Feb. 15, 2017, pp. 100-107. https://doi.org/10.7735/ksmte.2017.26.1.100.

Prodways Tech, Prodways Movinglight Technology Retrieved on Jul. 2, 2020 from Web Link: https://www.prodways.com/en/the-prodways-movinglight-technology/.

RAMCO Equipment Corporation, RAMCO RamTough-Fully Automated Wash/Rinse/Dry System, YouTube, Jul. 9, 2013, 1 Page. Retrieved from Webpage: https://www.youtube.com/watch?v=i8S5Oc3FVFU.

Ricoh Imaging Company Ltd., The Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imagin.com.jp/english/products/k-1-2/feature/02.html.

Sonics & Materials, Inc., Ultrasonic Food Cutting Equipment, Sonics & Materials, Inc., Retrieved on Jun. 26, 2020, 4 Pages. https://www.sonics.com/food-cutting.

Stemmer Imaging, Ultra-High Resolution for Industrial Imaging, Germany, 9 Pages. Retrieved on Mar. 30, 2021 from Webpage: https://www.stemmer-imaging.com/en/knowledge-base/pixel-shift-technology/.

Stevenson, Admatec's Ceramic 3D Printers, Ceramic, Metal, Fabbaloo 3D Printing News, Jan. 21, 2019, 8 Pages. Retrieved Nov. 24, 2020 from Weblink: https://www.fabbaloo.com/blog/2019/1/21/admatecs-ceramic-3d-printers.

Techmetals, Electroless Nickel (TM 117C), Engineered Metal Finishing & Performance Coatings, 1 Page. Retrieved from Webpage: https://techmetals.com/pdfs/TM_117C.pdf https://techmetals.com/tm117c-2/.

Telsonic Ultrasonics, Cutting Awning Fabrics and Sealing the Edge, The Powerhouse of Ultrasonics, 2017, 1 Page. https://www.telsonic.com/fileadmin/applications/AS_206_Cut_Seal_Markisengewebe_EN.pdf.

Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.

Tok et al., Tape Casting of High Dielectric Ceramic Substrates for Microelectronics Packaging, Journal of Materials Engineering and Performance, vol. 8, 1999, pp. 469-472. (Abstract Only) https://link.springer.com/article/10.1361/105994999770346783.

Wikipedia, Pixel Shifting, 2 Pages. Retrieved Mar. 30, 2021 from Webpage: https://en.wikipedia.org/wiki/Pixel_shifting.

Wikipedia, Standing Wave, 11 Pages. Retrieved Mar. 17, 2021 from Webpage: https://en.wikipedia.org/wiki/Standing_wave.

\* cited by examiner

RESIN MANAGEMENT SYSTEM FOR ADDITIVE MANUFACTURING

FIELD

The present subject matter relates generally to an additive manufacturing apparatus, and more particularly to a resin management system for the additive manufacturing apparatus.

BACKGROUND

Additive manufacturing is a process in which material is built up layer-by-layer to form a component. Stereolithography (SLA) is a type of additive manufacturing process, which employs a vessel of radiant-energy curable photopolymer "resin" and a curing energy source, such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin. Exposure to the radiation cures and solidifies the pattern in the resin and joins it to a previously cured layer.

In some instances, additive manufacturing may be accomplished through a "tape casting" process. In this process, a resin is deposited onto a resin support, which may be a flexible radiotransparent tape, a foil, and/or another type of resin support, that is fed out from a supply reel to a build zone. Radiant energy is used to cure the resin to a component that is supported by a stage in the build zone. Once the curing of the first layer is complete, the stage and the resin support are separated from one another. The resin support is then advanced and fresh resin is provided to the build zone. In turn, the first layer of the cured resin is placed onto the fresh resin and cured through the energy device to form an additional layer of the component. Subsequent layers are added to each previous layer until the component is completed.

In operation, as each layer of the component is formed, resin may be deposited on the resin support for forming the next sequential layer of the component. A first portion of the resin may be cured, and a second portion may be translated out of the build zone. Accordingly, it may be beneficial for the additive manufacturing apparatus to include a resin management system that manages the deposition of the resin onto the resin support and/or the reclamation of the second portion of the resin.

BRIEF DESCRIPTION

Aspects and advantages of the present disclosure will be set forth in part in the following description, or may be obvious from the description, or may be learned through practice of the present disclosure.

In some embodiments of the present disclosure, an additive manufacturing apparatus includes a stage configured to hold a component. A radiant energy device is operable to generate and project radiant energy in a patterned image. An actuator is configured to change a relative position of the stage relative to the radiant energy device. A resin management system includes a material deposition assembly upstream of the stage and is configured to deposit a resin on a resin support. The material deposition assembly includes a reservoir configured to retain a first volume of the resin, a vessel separated from the reservoir and configured to store a second volume of the resin, and an impeller positioned within the vessel and configured to agitate the resin within the vessel.

In some embodiments of the present disclosure, a method of operating an additive manufacturing apparatus includes operably coupling a bracket of a first vessel with a brace of said additive manufacturing apparatus. The method also includes coupling a conduit to direct a resin within the first vessel to a reservoir. The method further includes actuating a regulator to allow the resin to be gravity fed from the first vessel to the reservoir.

In some embodiments of the present disclosure, an additive manufacturing apparatus includes a stage configured to hold one or more cured layers of a resin that form a component. A radiant energy device is positioned opposite to the stage such that it is operable to generate and project radiant energy in a patterned image. A resin management system includes a reclamation system downstream of the stage. The reclamation system includes a collection structure configured to remove at least a portion of the resin from a resin support. The reclamation system further includes a vessel configured to retain the resin removed from the resin support. An impeller positioned within the vessel and configured to agitate the resin within the vessel.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
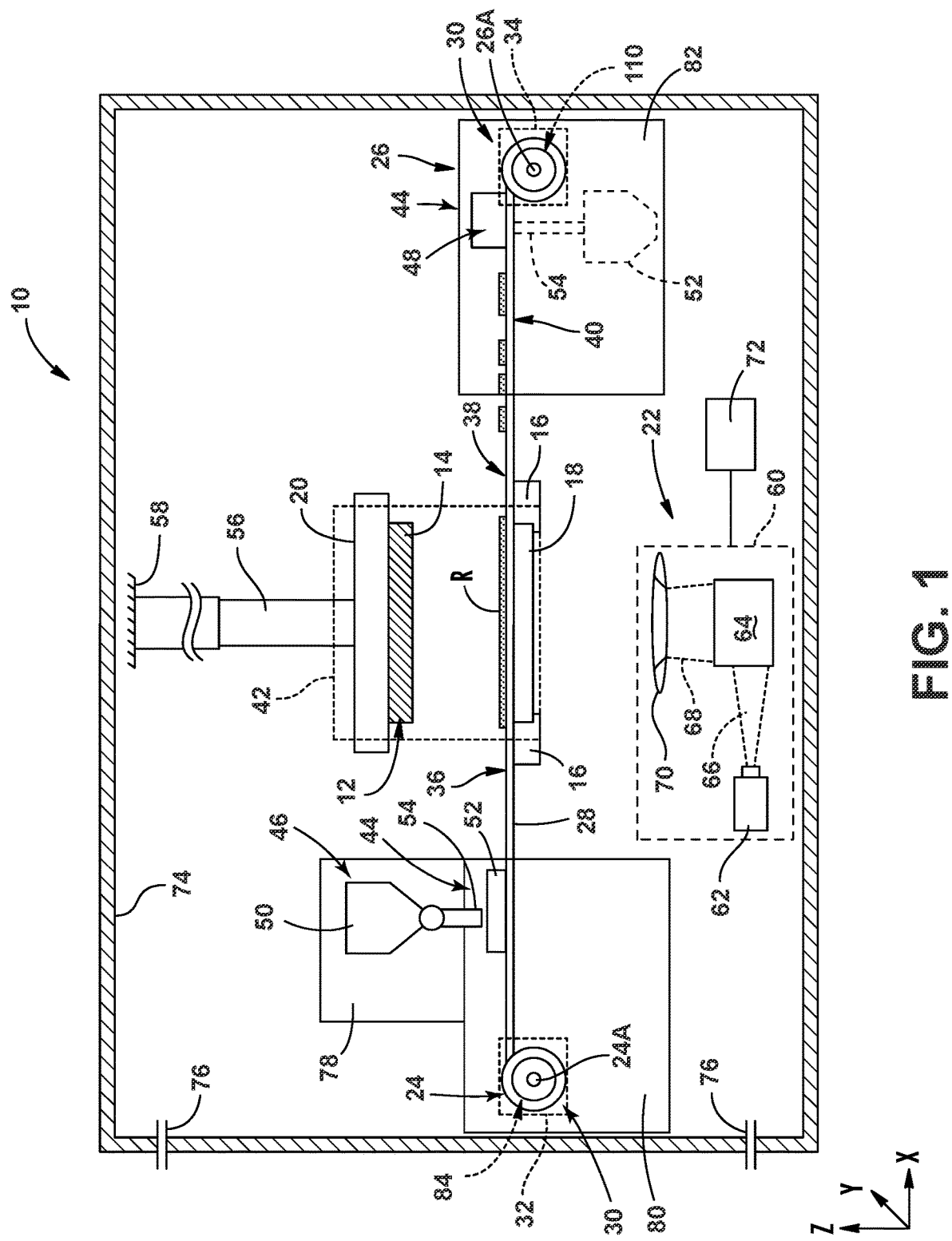
FIG. 1 is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the present disclosure, one or more examples of which are illustrated in the accompanying drawings. The detailed description uses numerical and letter designations to refer to features in the drawings. Like or similar designations in the drawings and description have been used to refer to like or similar parts of the present disclosure.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a resin support movement along the manufacturing apparatus. For example, "upstream" refers to the direction from which the resin support moves, and "downstream" refers to the direction to which the resin support moves. The term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) (e.g., resins) are provided on each other to "build up," layer-by-layer, a three-dimensional component. The successive layers generally cure together to form a monolithic component which may have a variety of integral sub-components. Although additive manufacturing technology is described herein as enabling the fabrication of complex objects by building objects point-by-point, layer-by-layer, variations of the described additive manufacturing apparatus and technology are possible and within the scope of the present subject matter.

The additive manufacturing apparatus can include a support plate, a window supported by the support plate, and a stage moveable relative to the window. The additive manufacturing apparatus further includes a resin support (such as a flexible tape or foil) that supports a resin. The resin support, with the resin thereon, is positioned between the stage and the window. A radiant energy device is configured to cure a portion of the resin forming the component, which is translated towards and away from the resin support by the stage between successive curing operations.

In various embodiments, the apparatus further includes a resin management system, which may include a material deposition assembly and/or a reclamation system. The material deposition assembly may be any device or combination of devices that is operable to apply a layer of the resin on the resin support. Conversely, the reclamation system may be configured to remove at least a portion of the resin that remains on the resin support after the resin support is removed from a build zone.

In some instances, the material deposition assembly includes a reservoir configured to retain a first volume of the resin and define a thickness of the resin on the resin support as the resin support is translated in an X-axis direction. A vessel is positioned above the reservoir in a Z-axis direction and is configured to store a second volume of the resin. A conduit is configured to direct the resin from the vessel to the reservoir. The conduit may be positioned along a bottom portion of the vessel such that the resin may be gravity fed from the vessel to the conduit, which may generally prevent the introduction of air to the resin as the air is transferred into and/or through the conduit. As used herein, "gravity fed" is any system that utilizes gravity to move the resin into and/or out of a vessel or reservoir without the use of a pump or other fluid moving device.

The reclamation system may include a collection structure, such as a wiper assembly, a blade assembly, and/or any other removal assembly. The resin may be directed from the collection structure through a conduit and to a vessel. In some instances, the vessel may be positioned below the collection structure in the Z-axis direction such that the resin is gravity fed from the collection structure to the vessel through the conduit. The vessel within the material deposition assembly may have a common geometry to that within the reclamation system such that the vessels may be interchangeably used within each system. Alternatively, the vessel within the material deposition assembly may have a first geometry and the vessel within the reclamation system may have a second, different geometry.

The resin management system provided herein may allow for the resin to be moved through the apparatus while minimizing any alterations to the resin composition. Such alterations may include aerating the composition, which may negatively impact the quality of a component built by the apparatus.

Referring to the drawings wherein identical reference numerals denote the similar elements throughout the various views, FIG. 1 schematically illustrates an example of one type of suitable apparatus 10 for forming a component 12 created through one or more cured layers 14 of the resin R. The apparatus 10 can include one or more of a support plate 16, a window 18, a stage 20 that is movable relative to the window 18, and a radiant energy device 22, which, in combination, may be used to form any number (e.g., one or more) of additively manufactured components 12.

In the illustrated example, the apparatus 10 includes a feed module 24, which may include a feed mandrel 24A, and a take-up module 26, which may include a take-up mandrel 26A, that are spaced-apart and configured to couple with respective end portions of a resin support 28, such as a flexible tape or foil or another type of the resin support extending therebetween. A portion of the resin support 28 can be supported from underneath by the support plate 16. Suitable mechanical supports (frames, brackets, etc.) may be provided for the mandrels 24A, 26A and the support plate 16. The feed mandrel 24A and/or the take-up mandrel 26A can be configured to control the speed and direction of the resin support 28 such that the desired tension and speed is maintained in the resin support 28 through a drive system 30. In various examples, the drive system 30 can be configured as one or more control devices 32, 34 associated with the feed mandrel 24A and/or the take-up mandrel 26A. Moreover, the drive system 30 may include various components, such as motors, actuators, feedback sensors, and/or controls can be provided for driving the mandrels 24A, 26A in such a manner to move at least a portion of the resin support 28 between the mandrels 24A, 26A.

In various embodiments, the window 18 is transparent and can be operably supported by the support plate 16. Further, the window 18 and the support plate 16 can be integrally formed such that one or more windows 18 are integrated within the support plate 16. Likewise, the resin support 28 is also transparent or includes portions that are transparent. As used herein, the terms "transparent" and "radiotransparent" refer to a material that allows at least a portion of radiant energy of a selected wavelength to pass through. For example, the radiant energy that passes through the window 18 and the resin support 28 can be in the ultraviolet spectrum, the infrared spectrum, the visible spectrum, or any other practicable radiant energy. Non-limiting examples of transparent materials include polymers, glass, and crystalline minerals, such as sapphire or quartz.

The resin support 28 extends between the feed module 24 and the take-up module 26 and defines a "resin surface" 36, which is shown as being planar, but could alternatively be arcuate. In some instances, the resin surface 36 may be defined by a first side 38 of the resin support 28 and may be positioned to face the stage 20 with the window 18 on an opposing, second side 40 of the resin support 28 from the stage 20. For purposes of convenient description, the resin surface 36 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the resin support 28. As used herein, the Y-axis refers to the transverse direction across the width of the resin support 28 and generally perpendicular to the machine direction. As used herein, the Z-axis refers to the stage direction that can be defined as the direction of movement of the stage 20 relative to the window 18.

The resin surface 36 may be configured to be "non-stick," that is, resistant to adhesion of a cured resin R. The non-stick properties may be embodied by a combination of variables such as the chemistry of the resin support 28, its surface finish, and/or applied coatings. For instance, a permanent or semi-permanent non-stick coating may be applied. One non-limiting example of a suitable coating is polytetrafluoroethylene ("PTFE"). In some examples, all or a portion of the resin surface 36 may incorporate a controlled roughness or surface texture (e.g. protrusions, dimples, grooves, ridges, etc.) with nonstick properties. Additionally or alternatively, the resin support 28 may be made in whole or in part from an oxygen-permeable material.

For reference purposes, an area or volume immediately surrounding the location of the resin support 28 and the window 18 or transparent portion defined by the support plate 16 may be defined as a "build zone," labeled 42.

In some instances, the apparatus 10 may further include a resin management system 44, which may include a material deposition assembly 46 and/or a reclamation system 48. The material deposition assembly 46 may be any device or combination of devices that is operable to apply a layer of the resin R on the resin support 28. The material deposition assembly 46 may optionally include a device or combination of devices to define a height of the resin R on the resin support 28 and/or to level the resin R on the resin support 28. Nonlimiting examples of suitable material deposition assemblies include chutes, hoppers, pumps, spray nozzles, spray bars, or printheads (e.g. inkjets).

In the illustrated embodiment, the material deposition assembly 46 includes a vessel 50 and a reservoir 52. A conduit 54 extends from the vessel 50 to direct resin from the vessel 50 to the reservoir 52. The conduit 54 may be positioned along a bottom portion of the vessel 50 such that the resin R may be gravity fed from the vessel 50 to the conduit 54, which may generally prevent the introduction of air to the resin R as the air is transferred into and/or through the conduit 54. In some instances, a filter may be positioned upstream, downstream, and/or within the conduit with respect to the flow of resin from the vessel to the reservoir.

In such instances, the resin may be gravity fed through the filter prior to entering the reservoir to catch various agglomerates, partially cured resin pieces, and/or other foreign objects that may affect the resin once it is thinned out on the resin support 28 or may affect the quality of the component 12.

The reservoir 52 may include any assembly to control the thickness of the resin R applied to the resin support 28, as the resin support 28 passes under and/or through the reservoir 52. The reservoir 52 may be configured to retain a first volume of the resin R and define a thickness of the resin R on the resin support 28 as the resin support 28 is translated in an X-axis direction. The vessel 50 may be positioned above the reservoir 52 in a Z-axis direction, or in any other position, and configured to store a second volume of the resin R. In various embodiments, when the first volume of the resin R deviates from a predefined range, additional resin R is supplied from the vessel 50 to the reservoir 52. In various non-limiting examples, the vessel 50 may be configured to retain 1 liter (L), 2 L, 5 L, 10 L, 15 L, 19 L, 20 L, 30 L, or more of resin therein and the reservoir 52 may be configured to retain 100 milliliters (mL), 150 mL, 200 mL, 250 mL, 280 mL, 300 mL or more of resin therein. Due to the variations in volume between the vessel 50 and the reservoir 52, the material deposition assembly 46 may have a vessel volume to reservoir volume ratio of greater than 5:1, 15:1, 25:1, 35:1, 45:1, 55:1, 65:1, 67:1, or more. It will be appreciated that these ratios are generally greater than commercially available apparatuses.

In various embodiments, the vessel 50 may be operably coupled with a material deposition assembly panel 78, which is then operably coupled with a frame on the apparatus 10. Similarly, various components of the feed module 24 may be operably coupled with a feed panel 80 and various components of the take-up module 26 may be operably coupled with a take-up panel 82.

In some embodiments, the reclamation system 48 may be configured to remove at least a portion of the resin R that remains on the resin support 28 after the resin support 28 is removed from a build zone 42. For example, the reclamation system 48 may include a collection structure 238 (FIG. 13), such as a wiper assembly, a blade assembly, and/or any other removal assembly. The resin R may be directed from the collection structure 238 through a conduit 54 and to a vessel 50. In some instances, the vessel 50 may be positioned below the collection structure 238 in the Z-axis direction such that the resin R is gravity fed from the collection structure 238 to the vessel 50 through the conduit 54. The vessel 50 within the material deposition assembly 46 may have a common geometry to that within the reclamation system 48 such that the vessels 50 may be interchangeably used within each system. Alternatively, the vessel 50 within the material deposition assembly 46 may have a first geometry and the vessel 50 within the reclamation system 48 may have a second, different geometry.

The resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The resin R may be provided in solid (e.g. granular) or liquid form, including a paste or slurry.

Furthermore, the resin R can have a relatively high viscosity fluid that will not "slump" or run off during the build process. The composition of the resin R may be selected as desired to suit a particular application. Mixtures of different compositions may be used. The resin R may be selected to have the ability to out-gas or burn off during further processing, such as a sintering process.

The resin R may incorporate a filler. The filler may be pre-mixed with the resin R, then loaded into the material deposition assembly 46. The filler includes particles, which are conventionally defined as "a very small bit of matter." The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon via application of sufficient energy. For example, fusibility is a characteristic of many available powders including, but not limited to, polymeric, ceramic, glass, and/or metallic materials. The proportion of filler to resin R may be selected to suit a particular application. Generally, any amount of filler may be used so long as the combined material is capable of flowing and being leveled, and there is sufficient resin R to hold together the particles of the filler in the cured state.

With further reference to FIG. 1, the stage 20 is capable of being oriented parallel to the resin surface 36 or the X-Y plane. Various devices may be provided for moving the stage 20 relative to the window 18 parallel to the Z-axis direction. For example, as illustrated in FIG. 1, the movement may be provided through an actuator 56 connected between the stage 20 and a static support 58 and configured to change a relative position of the stage 20 relative to the radiant energy device 22, the support plate 16, the window 18, and/or any other static component of the apparatus 10. The actuator 56 may be configured as a ballscrew electric actuator, linear electric actuator, pneumatic cylinder, hydraulic cylinder, delta drive, or any other practicable device may additionally or alternatively be used for this purpose. In addition to, or as an alternative to, making the stage 20 movable, the resin support 28 could be movable parallel to the Z-axis direction.

The radiant energy device 22 may be configured as any device or combination of devices operable to generate and project radiant energy on the resin R in a suitable pattern and with a suitable energy level and other operating characteristics to cure the resin R during the build process. For example, as shown in FIG. 1, the radiant energy device 22 may include a projector 60, which may generally refer to any device operable to generate a radiant energy patterned image of suitable energy level and other operating characteristics to cure the resin R. As used herein, the term "patterned image" refers to a projection of radiant energy comprising an array of one or more individual pixels. Non-limiting examples of patterned imaged devices include a DLP projector or another digital micromirror device, a two-dimensional array of LEDs, a two-dimensional array of lasers, and/or optically addressed light valves. In the illustrated example, the projector 60 includes a radiant energy source 62 such as a UV lamp, an image forming apparatus 64 operable to receive a source beam 66 from the radiant energy source 62 and generate a patterned image 68 to be projected onto the surface of the resin R, and optionally focusing optics 70, such as one or more lenses.

The image forming apparatus 64 may include one or more mirrors, prisms, and/or lenses and is provided with suitable actuators, and arranged so that the source beam 66 from the radiant energy source 62 can be transformed into a pixelated image in an X-Y plane coincident with the surface of the resin R. In the illustrated example, the image forming apparatus 64 may be a digital micro-mirror device.

The projector 60 may incorporate additional components, such as actuators, mirrors, etc. configured to selectively move the image forming apparatus 64 or another part of the projector 60 with the effect of rastering or shifting the location of the patterned image on the resin surface 36. Stated another way, the patterned image may be moved away from a nominal or starting location.

In addition to other types of radiant energy devices 22, the radiant energy device 22 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 62 and a beam steering apparatus. The radiant energy source 62 may include any device operable to generate a beam of suitable power and other operating characteristics to cure the resin R. Non-limiting examples of suitable radiant energy sources 62 include lasers or electron beam guns.

The apparatus 10 may be operably coupled with a computing system 72. The computing system 72 in FIG. 1 is a generalized representation of the hardware and software that may be implemented to control the operation of the apparatus 10, including some or all of the stage 20, the radiant energy device 22, the actuator 56, and the various parts of the apparatus 10 described herein. The computing system 72 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control.

Optionally, the components of the apparatus 10 may be surrounded by a housing 74, which may be used to provide a shielding or inert gas (e.g., a "process gas") atmosphere using gas ports 76. Optionally, pressure within the housing 74 could be maintained at a desired level greater than or less than atmospheric. Optionally, the housing 74 could be temperature and/or humidity controlled. Optionally, ventilation of the housing 74 could be controlled based on factors such as a time interval, temperature, humidity, and/or chemical species concentration. In some embodiments, the housing 74 can be maintained at a pressure that is different than an atmospheric pressure.

Figure 2:
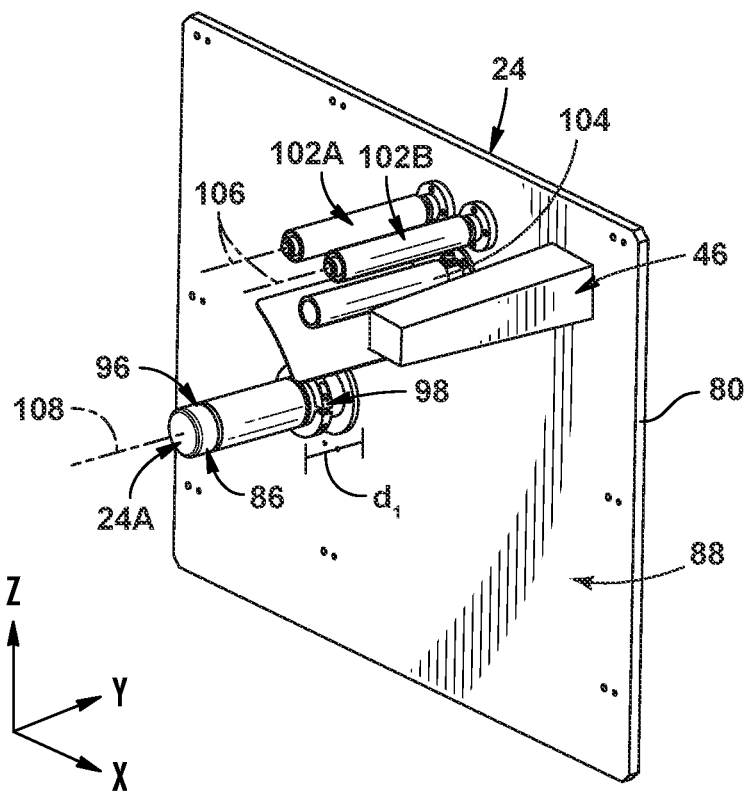
FIG. 2 is a front perspective view of a feed panel configured to support one or more components of a feed module in accordance with various aspects of the present disclosure.
Figure 3:
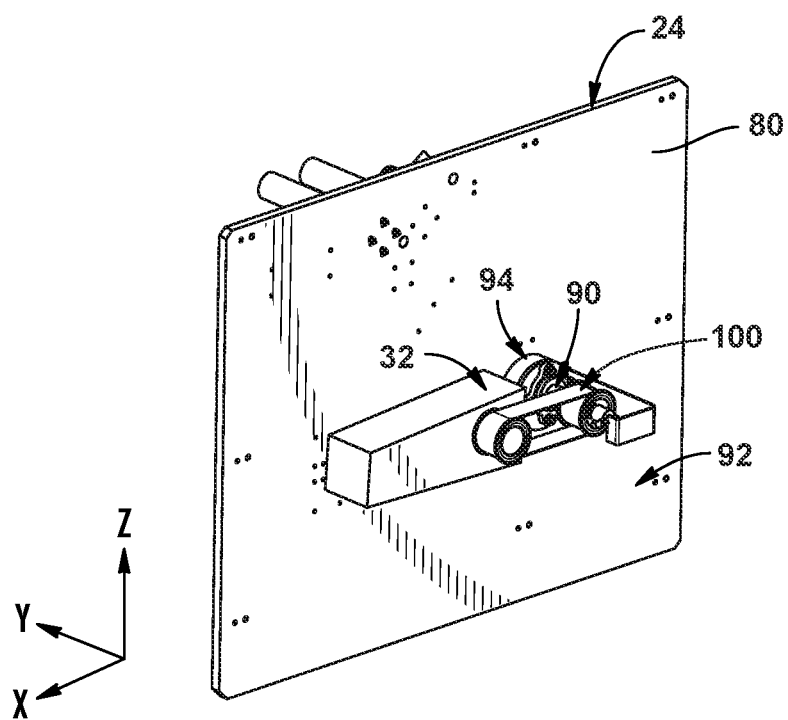
FIG. 3 is a rear perspective view of the feed panel of the feed module in accordance with various aspects of the present disclosure.

Referring to FIGS. 2 and 3, exemplary perspective views of the feed module 24 including a feed panel 80 are illustrated in accordance with exemplary embodiments of the present disclosure. As illustrated, the feed mandrel 24A can be anchored to the feed panel 80 and may support and rotate a feed portion 84 (FIG. 1) of the resin support 28 (FIG. 1). In various embodiments, the feed mandrel 24A includes a front portion 86 on a first side 88 of the feed panel 80 and a rear portion 90 on a second, opposing side 92 of the feed panel 80. In some instances, a bearing 94 may be positioned along the front portion 86, the rear portion 90, and/or between the front and rear portions 86, 90.

The front portion 86 of the feed mandrel 24A may include a cylindrical portion 96 that is configured to accept the first portion 84 of the resin support 28 thereabout. In various instances, the resin support 28 may be operably coupled to a feed spool (e.g., cardboard spool, polymeric spool, paper-based spool, metallic spool, composite spool, elastomeric spool, etc.). The feed spool may be positioned about the feed mandrel 24A.

A stop 98 may be positioned between the cylindrical portion 96 and the feed panel 80. As such, when the resin support 28 is wrapped about the feed mandrel 24A, the stop 98 defines a first distance $d_1$ between an inner edge of the resin support 28 and the feed panel 80. In some examples, the feed mandrel 24A may be configured to move between a disengaged position and an engaged position. In operation, the feed mandrel 24A may be placed in the disengaged position to allow the feed spool, and the resin support 28 wound thereabout, to be slid along the feed mandrel 24A to a position in which an end portion of the feed spool is in contact or close proximity to the stop 98. Once the feed spool is positioned about the feed mandrel 24A, the feed mandrel 24A may be placed in the engaged position causing the feed spool, and, consequently, the feed portion 84 of the resin support 28 to rotate with the feed mandrel 24A.

In some embodiments, the drive system 30 (FIG. 1) may include a first control device 32 operably coupled with the rear portion 90 of the feed mandrel 24A. The first control device 32 may be configured as one or more motors, actuators, or any other device that may rotate the feed mandrel 24A. Further, as illustrated in FIG. 3, the first control device 32 may include a transmission 100 in the form of a belt system, a gear system, and/or any other practicable system.

With further reference to FIGS. 2 and 3, one or more rollers 102A, 102B and/or a load cell 104 may be anchored to the first side 88 of the feed panel 80. For example, a pair of rollers 102A, 102B may be positioned above the feed mandrel 24A in the Z-axis direction. In some instances, the pair of rollers 102A, 102B may have an axis of rotation 106 that is generally parallel to an axis of rotation 108 of the feed mandrel 24A.

The load cell 104 may be positioned between the pair of rollers 102A, 102B and the feed mandrel 24A in the Z-axis direction. The load cell 104 may be configured as a force transducer that converts a tension or torque provided by the resin support 28 onto the load cell 104 into an electrical signal that can be measured by the computing system 72 to determine a tension of the resin support 28. In some embodiments, the resin support 28 may be provided from the feed mandrel 24A around the first roller 102A, the load cell 104, and, subsequently, the second roller 102B.

Figure 4:
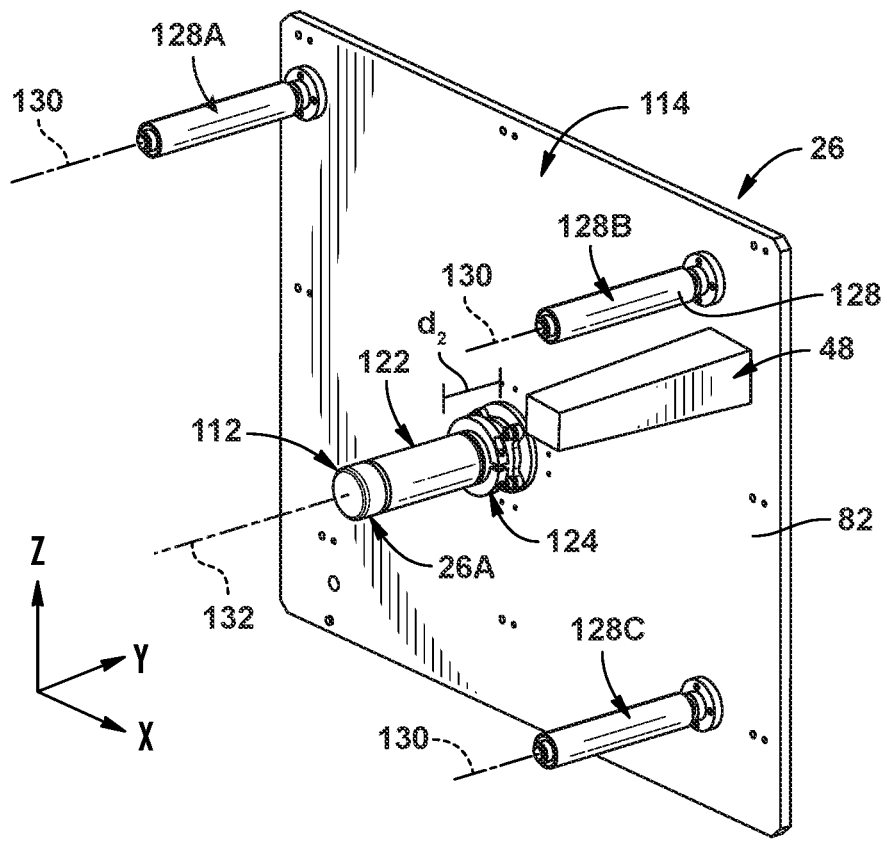
FIG. 4 is a front perspective view of a take-up panel configured to support one or more components of a take-up module in accordance with various aspects of the present disclosure.
Figure 5:
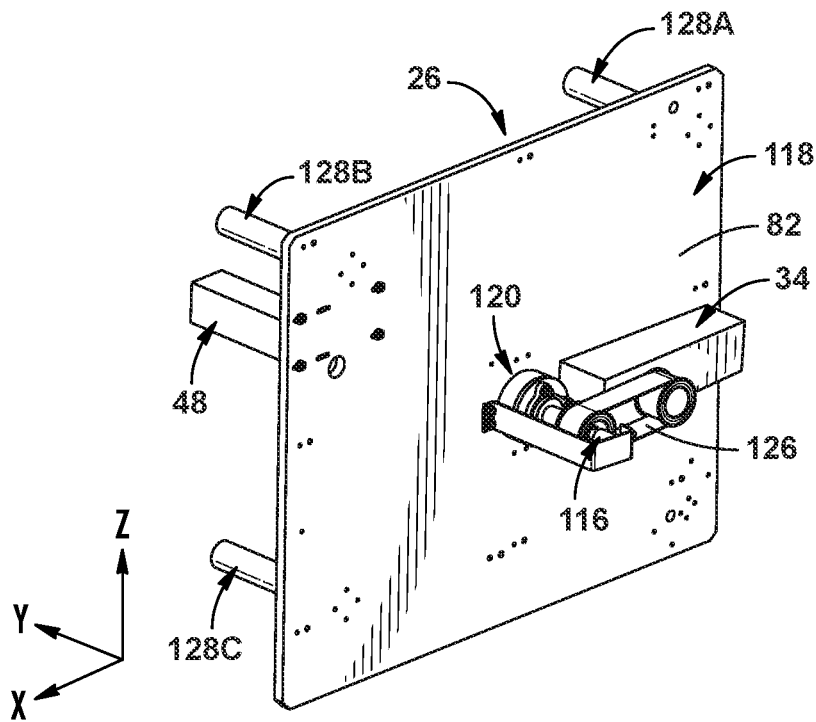
FIG. 5 is a rear perspective view of the take-up panel of the take-up module in accordance with various aspects of the present disclosure.

Referring to FIGS. 4 and 5, respective front and rear perspective views of the take-up module 26 including a take-up panel 82 are illustrated in accordance with exemplary embodiments of the present disclosure. As illustrated, the take-up mandrel 26A may be anchored to the take-up panel 82 and configured to support a second portion 110 (FIG. 1) of the resin support 28 (FIG. 1). In various embodiments, the take-up mandrel 26A includes a front portion 112 on a first side 114 of the take-up panel 82 and a rear portion 116 on a second, opposing side 118 of the take-up panel 82. In some instances, a bearing 120 may be positioned along the front portion 112, the rear portion 116, and/or between the first and second portions 112, 116 of the take-up mandrel 26A.

The front portion 112 of the take-up mandrel 26A may include a cylindrical portion 122 that is configured to accept the second portion 110 of the resin support 28 thereabout. In various instances, the resin support 28 may be operably coupled to a take-up spool (e.g., cardboard spool, polymeric spool, paper-based spool, metallic spool, composite spool, elastomeric spool, etc.). The take-up spool may be positioned about the take-up mandrel 26A.

A stop 124 may be positioned between the cylindrical portion 122 and the take-up panel 82. As such, the resin support 28 is wrapped about the take-up mandrel 26A, the stop 124 defines a second distance $d_2$ between the inner edge of the resin support 28 and the take-up panel 82. In some examples, the take-up mandrel 26A may be configured to move between a disengaged position and an engaged position. In operation, the take-up mandrel 26A may be placed in the disengaged position to allow the take-up spool to be slid along the take-up mandrel 26A to a position in which an end portion of the take-up spool is in contact or close proximity to the stop 124. Once the take-up spool is positioned about the take-up mandrel 26A, the take-up mandrel 26A may be placed in the engaged position causing the take-up spool, and, consequently, the second portion 110 of the resin support 28 to rotate with the take-up mandrel 26A.

Similar to the feed module 24, a second control device 34 may be operably coupled with the rear portion 116 of the take-up mandrel 26A. The second control device 34 may be configured as one or more motors, actuators, or any other device that may rotate the take-up mandrel 26A. Further, as illustrated in FIG. 5, the second control device 34 may include a transmission 126 in the form of a belt system, a gear system, and/or any other practicable system. Moreover, the first control device 32 and the second control device 34 may be operably coupled with feedback sensors and/or controls that can be provided for driving the mandrels 24A, 26A in such a manner to maintain the resin support 28 tensioned between the mandrels 24A, 26A and to wind the resin support 28 from the feed mandrel 24A to the take-up mandrel 26A.

With further reference to FIGS. 4 and 5, one or more rollers 128 may be anchored to the first side 114 of the take-up panel 82. For example, a set of three rollers 128A, 128B, 128C may be positioned on various portions of the take-up panel 82. In some instances, each roller 128A, 128B, 128C may have an axis of rotation 130 that is generally parallel to an axis of rotation 132 of the take-up mandrel 26A.

The take-up panel 82 may further support the resin reclamation system 48, which may be configured to remove at least a portion of the resin R that remains on the resin support 28 after the resin support 28 is removed from a build zone 42 (FIG. 1).

Figure 6:
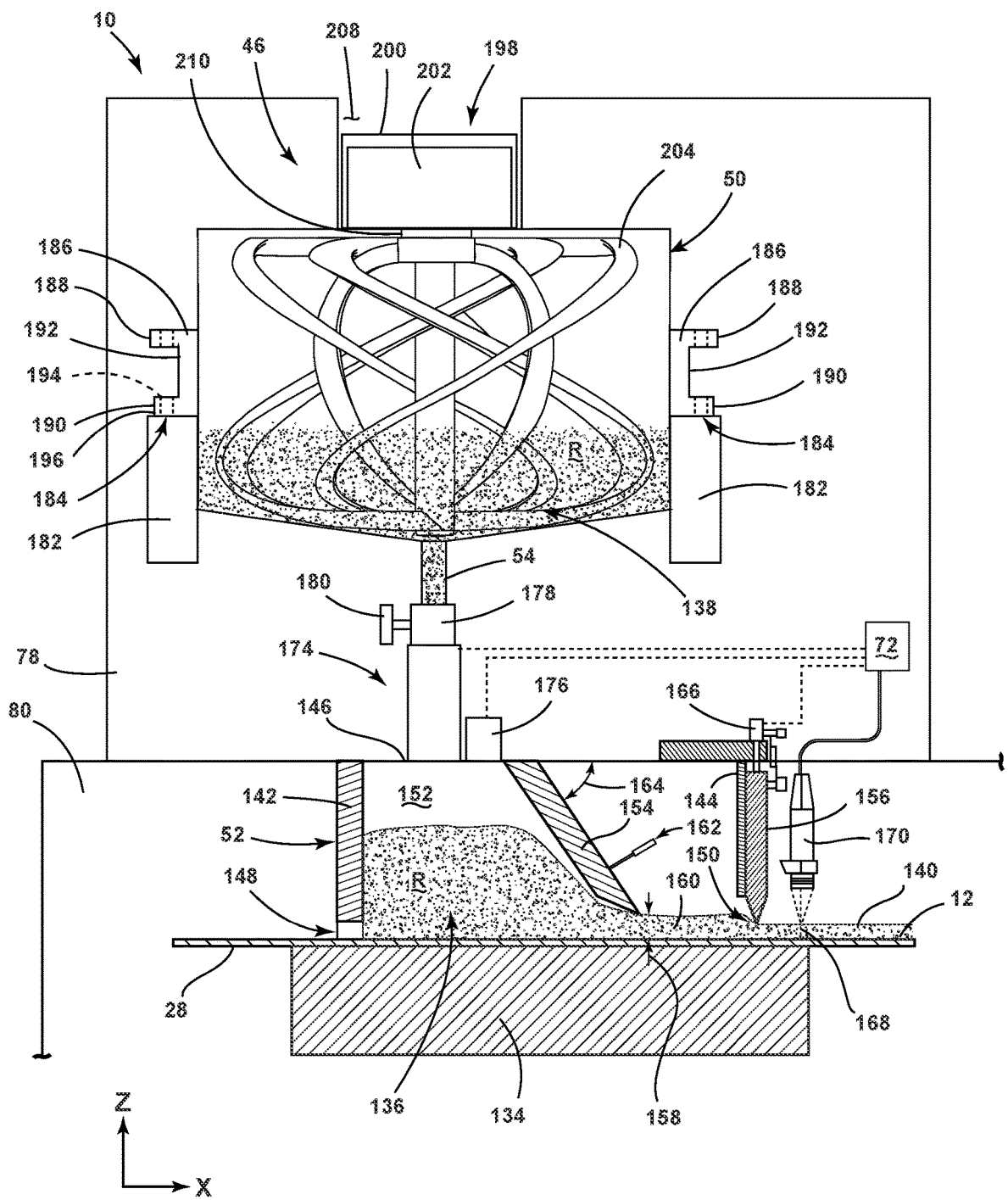
FIG. 6 is a schematic view of a material deposition assembly in accordance with various aspects of the present disclosure.

Referring now to FIG. 6, the material deposition assembly 46 is schematically illustrated according to various embodiments of the present disclosure. As illustrated, the material deposition assembly 46 includes a vessel 50 and a reservoir 52. A conduit 54 extends from the vessel 50 to direct resin R from the vessel 50 to the reservoir 52. The conduit 54 may be positioned along a bottom portion of the vessel 50 such that the resin R may be gravity fed from the vessel 50 to the conduit 54, which may generally prevent the introduction of air to the resin R as the air is transferred into and/or through the conduit 54.

The reservoir 52 may be configured to retain a first volume 136 of the resin R and produce a layer of the resin R on the resin support 28 as the resin support 28 is translated in an X-axis direction. The vessel 50 may be positioned above the reservoir 52 in a Z-axis direction, or in any other position, and configured to store a second volume 138 of the resin R. In various embodiments, when the first volume 136 of the resin R deviates from a predefined range, additional resin R is supplied from the vessel 50 to the reservoir 52.

In some embodiments, the reservoir 52 includes a base 134, an upstream wall 142, a downstream wall 144, and sidewalls 146. The upstream wall 142 may define a slot 148 therein to receive the resin support 28. The downstream wall 144 may define an aperture 150 that serves as an outlet for the resin support 28 and the layer 140 of the resin R. In various embodiments, the upstream wall 142, the downstream wall 144, and the sidewalls 146 define a cavity 152 that is configured to retain the first volume 136 of the resin R, which may be supplied by the conduit 54.

Continuing to refer to FIG. 6, in various examples, the material deposition assembly 46 can include a first doctor blade 154 and/or a second doctor blade 156 that are used to control the thickness of the resin R applied to the resin support 28, as the resin support 28 passes under the material deposition assembly 46. In the illustrated embodiment, the thickness of layer 140 is determined by the doctor blades 154, 156. In various embodiments, other material depositing apparatuses can be used separately or in combination with the first and second doctor blades 154, 156 such as, but not limited to, gravure rolls, metering rolls, weir-based cascades, direct die casting, and a combination thereof.

The first doctor blade 154 may be configured to act as a gross control for the thickness 158 of an initial deposited layer 160 of the resin R. An adjustment device 162 may be configured to adjust an angle 164 defined by a surface of the first doctor blade 154 and the top edge of the sidewall 146. The greater the angle 164, the lower thickness 158, i.e., the thinner initial deposited layer 160 will be. The adjustment device 162 can be a threaded screw assembly configured to extend and retract the order to affect change in the angle 164. The adjustment device 162 is mechanically linked to the first doctor blade 154.

The second doctor blade 156 can be movingly linked to the downstream wall 144 and can be moved by an actuator 166 to adjust and define the outlet gap. A control signal can be utilized to controllably connect the actuator 166 with the computing system 72. The layer 140 has a thickness 168 that is the distance between the surface of the resin R and the base of layer 140 which is in contact with the first surface of the resin support 28. Accordingly, the thickness 168 of the material layer 140 can be adjusted by a control action such as movement of the doctor blade 154 in response to signals from the computing system 72. In various embodiments, suitable control signals can be electrical, pneumatic, sonic, electromagnetic, a combination thereof, and/or any other type of signal. In addition, other suitable control actions include varying the speed of the resin support 28, adjusting the viscosity or other rheological property of the resin R, changing the width of the deposited material layer 140 such as by the repositioning of side dams.

Continuing to refer to a FIG. 6, a thickness sensor 170 is positioned downstream of the second doctor blade 156 and/or the downstream wall 144. The thickness sensor 170 is configured to determine a thickness 168 of the deposited material layer 140. As a result, the deposited material layer 140 has the thickness 168 as it passes from the material deposition assembly 46 into and through a build zone 42 as shown in FIG. 1. As represented in FIG. 6, the thickness sensor 170 is configured to generate monitoring signals indicative of the thickness 168 of the deposited material layer 140 and to transmit such signals to the computing system 72. The thickness sensor 170 may be embodied as one or more confocals, imaging sensor, or any other vision-based device. The thickness sensor 170 may additionally and/or alternatively be configured as any other practicable proximity sensor, such as, but not limited to, an ultrasonic sensor, a radar sensor, a LIDAR sensor, or the like.

The computing system 72 is configured to receive the monitoring signals and process such signals using predetermined algorithms to generate control signals for controlling the thickness of the deposited material layer 140. In this manner, closed loop control of the thickness 168 of the deposited material layer 140 can be achieved. Optionally, when the sensor indicates that the layer 140 is too thin additional resin R can be added to increase the thickness of the layer 140.

Still referring to FIG. 6, in several embodiments, the material deposition assembly 46 further includes a regulator 174 operably coupled with the conduit 54. The regulator 174 is configured to restrict flow of the resin R from the vessel 50 to the reservoir 52 in a first position and allow flow from the vessel 50 to the reservoir 52 in a second position. In some embodiments, the regulator 174 may be configured as a pneumatically actuated pinch valve. In various embodiments, suitable control of the regulator 174 can be accomplished through activation of an electrical device, a pneumatic device, a sonic device, an electromagnetic device, a combination thereof, and/or any other practicable device.

In various embodiments, the material deposition assembly 46 can further include a volume sensor 176. The volume sensor 176 can be configured to provide signals to the computing system 72 related to the first volume 136 of the resin R within the cavity 152 of the reservoir 52. The computing system 72 is configured to receive the monitoring signals and process such signals using predetermined algorithms to generate control signals for controlling the regulator 174. For instance, the computing system 72 can actuate the regulator 174 from the second position to the first position when the first volume 136 of the resin R is within a predefined range. In this manner, closed-loop control of the first volume 136 of the resin R can be achieved. Once the first volume 136 of the resin R returns to the predefined range, the computing system 72 can actuate the regulator 174 from the first position to the second position thereby blocking further flow of the resin R from the vessel 50 to the reservoir 52. The volume sensor 176 may be embodied as one or more imaging sensors or any other vision-based device. The volume sensor 176 may additionally and/or alternatively be configured as any other practicable proximity sensor, such as, but not limited to, an ultrasonic sensor, a radar sensor, a LIDAR sensor, or the like.

In some embodiments, the actuation of the regulator 174 may additionally or alternatively be based on any other input. For example, the volume of the resin R transferred from the vessel 50 to the reservoir 52 may be at least partially based on data provided by the thickness sensor 170, the volume of resin support 28 translated through the reservoir 52, and/or any other information.

In some examples, a restrictor 178 may also be operably coupled with the conduit 54 and configured to block flow of the resin R past the restrictor 178 when placed in a restricted position. Conversely, when placed in a flow position, the restrictor 178 may allow the resin R to flow past the restrictor 178. In some examples, the restrictor 178 may be manually moved between the blocked position and the flow position through a handle 180. However, the restrictor 178 may be moved between positions in any other manner without departing from the scope of the present disclosure.

In some instances, the restrictor 178 may be moved to the blocked position prior to the vessel 50 being removed from the apparatus 10. When the vessel 50 and/or a new vessel 50 is to be installed in the apparatus 10, the restrictor 178 may be maintained in the blocked position. Next, the conduit 54 may be operably coupled with the regulator 174. Once the conduit 54 is coupled with the regulator 174, the restrictor 178 may be placed in the flow position. As such, the restrictor 178 may be used to control the resin R during installation and removal of the vessels 50 from the apparatus 10.

With further reference to FIG. 6, in various embodiments, a brace 182 may be operably coupled with a frame of the manufacturing apparatus 10. For example, the brace 182 may be operably coupled with the material deposition assembly panel 78. In some instances, the brace 182 may extend from the material deposition assembly panel 78 in the Y-axis direction. Further, the brace 182 may define one or more support surfaces 184 that is configured to support and/or otherwise retain the vessel 50 in a predefined location.

As illustrated, in some examples, the vessel 50 may include one or more brackets 186 coupled thereto. For example, first and second brackets 186 may be operably coupled with opposite sides of the vessel 50. The one or more brackets 186 may be configured to retain the vessel 50 in a predefined location. In various embodiments, the one or more brackets 186 may include an upper portion 188, a lower portion 190, and a body portion 192 extending between the upper portion 188 and the lower portion 190. In some examples, the one or more brackets 186 may be retained or operably coupled with the braces 182. For instance, the lower portion 190 of the bracket 186, and/or any other portion of the bracket 186, may be positioned at least partially on the support surface 184.

In several embodiments, the brace 182 may include a brace locating pin 194 that extends from the support surface 184. The support pin may be integrally formed with the brace 182 and/or later attached thereto. The lower portion 190 of the bracket 186 may define a first locating void 196 that is sized to surround the brace locating pin 194 when the lower portion 190 of the bracket 186 is supported by the brace 182.

With further reference to FIG. 6, in some instances, a mixing assembly 198 may be configured to continuously and/or intermittently agitate the resin R within the vessel 50 to increase the consistency and quality of the resin R. As illustrated, in some embodiments, the mixing assembly 198 may include a housing 200 positioned above the vessel 50. The housing 200 supports a rotation assembly 202 capable of rotating an impeller 204 within the vessel 50. The rotation assembly 202 may be configured as a direct drive system that includes one or more motors, actuators, or any other device that may rotate the impeller 204. Alternatively, the rotation assembly 202 may be configured as an offset drive system in which the rotation assembly 202 is operably coupled with the impeller 204 through a transmission.

In various embodiments, the mixing assembly may be configured to rotate the impeller 204 at one or more speeds. In some instances, the impeller 204 may be rotated as a first speed (e.g., 0.01 to 40 rpm), which may be sufficient to generally prevent segregation and decrease the possibility of trapping air (aerating the slurry). In addition, the impeller 204 may be rotated at a second, faster speed (e.g., greater than 40 rpm), which may allow for the breaking up of agglomerates by providing more shear force to the resin R.

In various embodiments, the impeller 204 may be made from a wide array of materials, including, but not limited to, polymers, which may allow for the resin R to burn off in a sintering cycle, metals, which may provide wear resistance, ceramics (e.g. alumina coated), which may further increase wear resistance, and/or any other practicable material. In some embodiments, the impeller material may be matched to and/or compatible with the resin R being used in the manufacturing process as some resins R will be more abrasive and others will be less. Moreover, the impeller 204 may be cleanable (with solvents e.g. isopropyl alcohol, acetone, etc.) and the material of the impeller 204 may be based on the ability to clean the resin R from the impeller 204.

Figure 9:
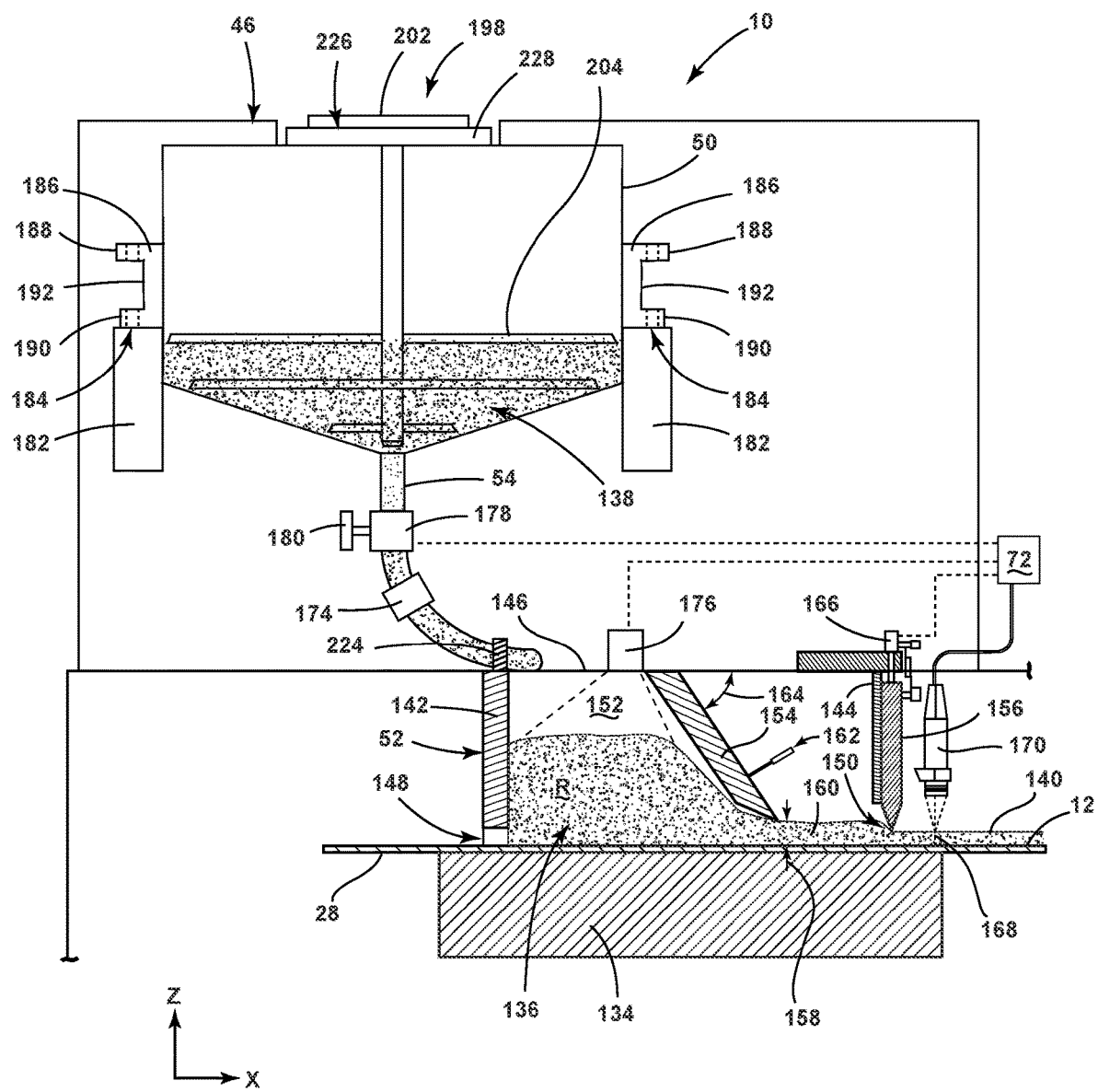
FIG. 9 is a schematic view of a material deposition assembly in accordance with various aspects of the present disclosure.
Figure 10:
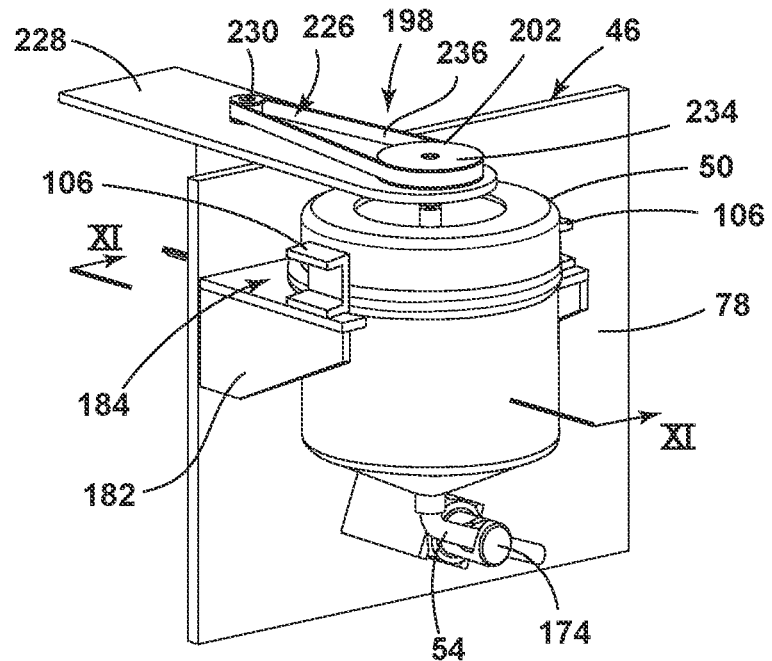
FIG. 10 is a front perspective view of the material deposition assembly in accordance with various aspects of the present disclosure.
Figure 11:
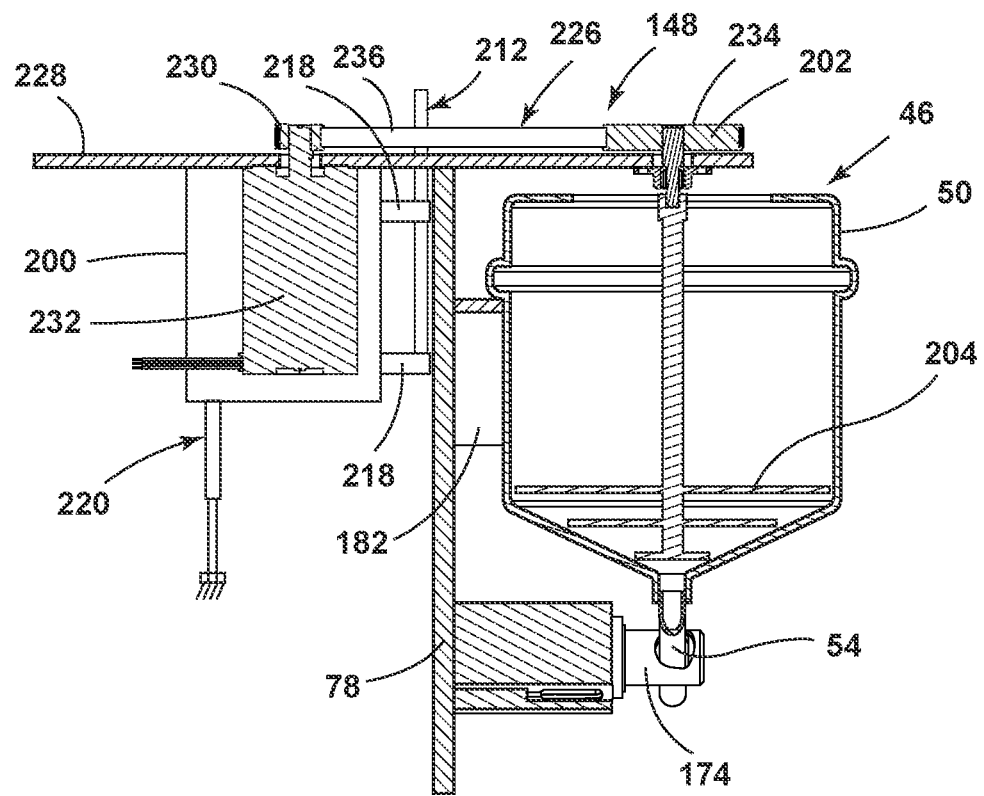
FIG. 11 is a cross-sectional view of the material deposition assembly of FIG. 10 taken along the line XI-XI.
Figure 12:
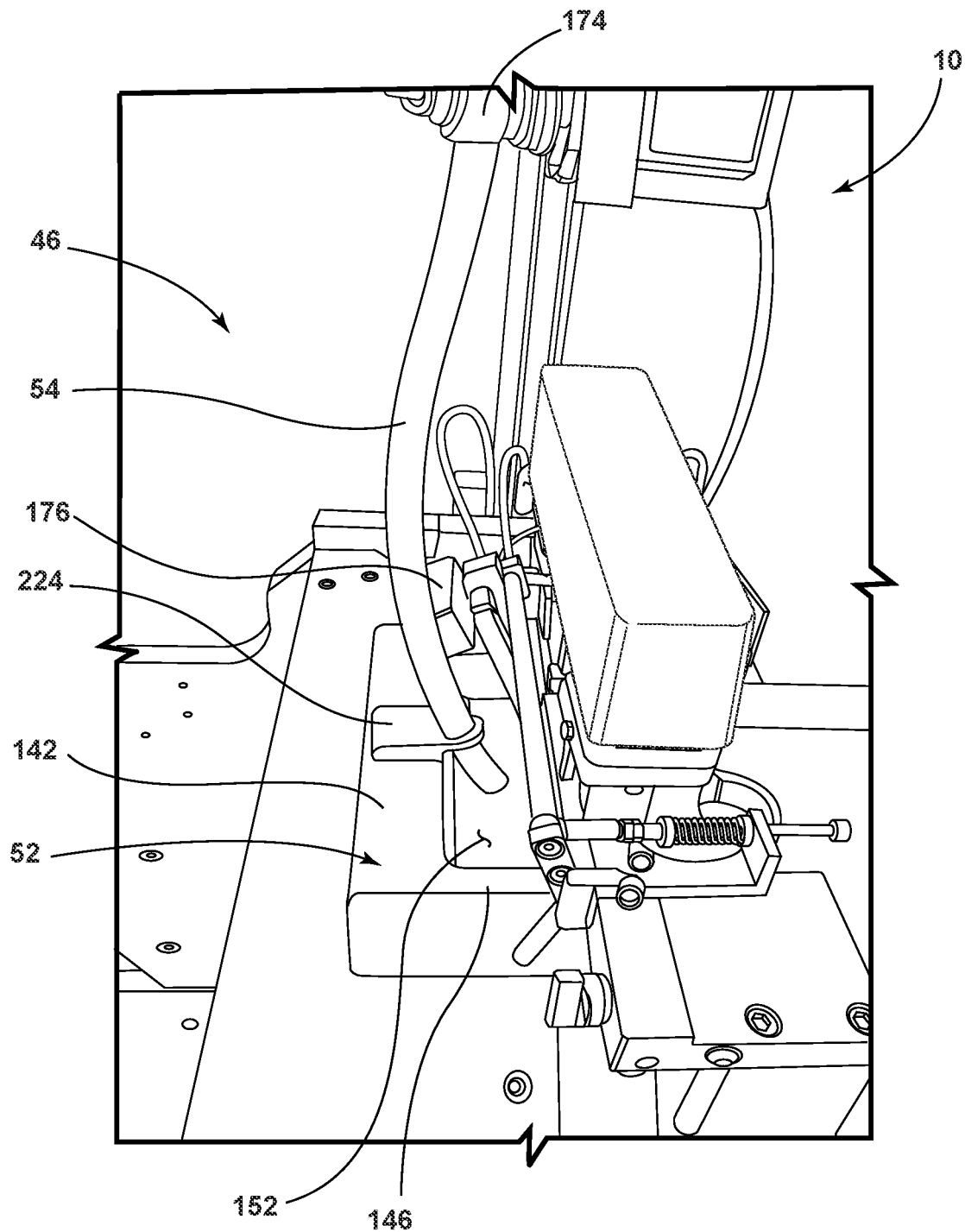
FIG. 12 is a perspective view of a conduit fluidly coupled with a reservoir of the material deposition assembly in accordance with various aspects of the present disclosure.

In the exemplary embodiment illustrated in FIG. 6, the impeller 204 is configured as a double-helix impeller. However, it will be appreciated that the impeller 204 may be of any design without departing from the scope of the present disclosure. For example, as illustrated in FIG. 9, the impeller 204 may be a pitched blade impeller. In embodiments utilizing a double-helix impeller, such as the one illustrated in FIG. 6, the impeller 204 may be used to blend high viscosity resins R operating in a laminar flow regime. The helical ribbons of the impeller 204 may also be designed for close wall clearance. Furthermore, the helical ribbons operate at relatively slow speeds rotating in a direction to create resin movement up along the wall. The resin R returns down the center of the vessel 50 providing overall blending in the vessel 50.

Figure 7:
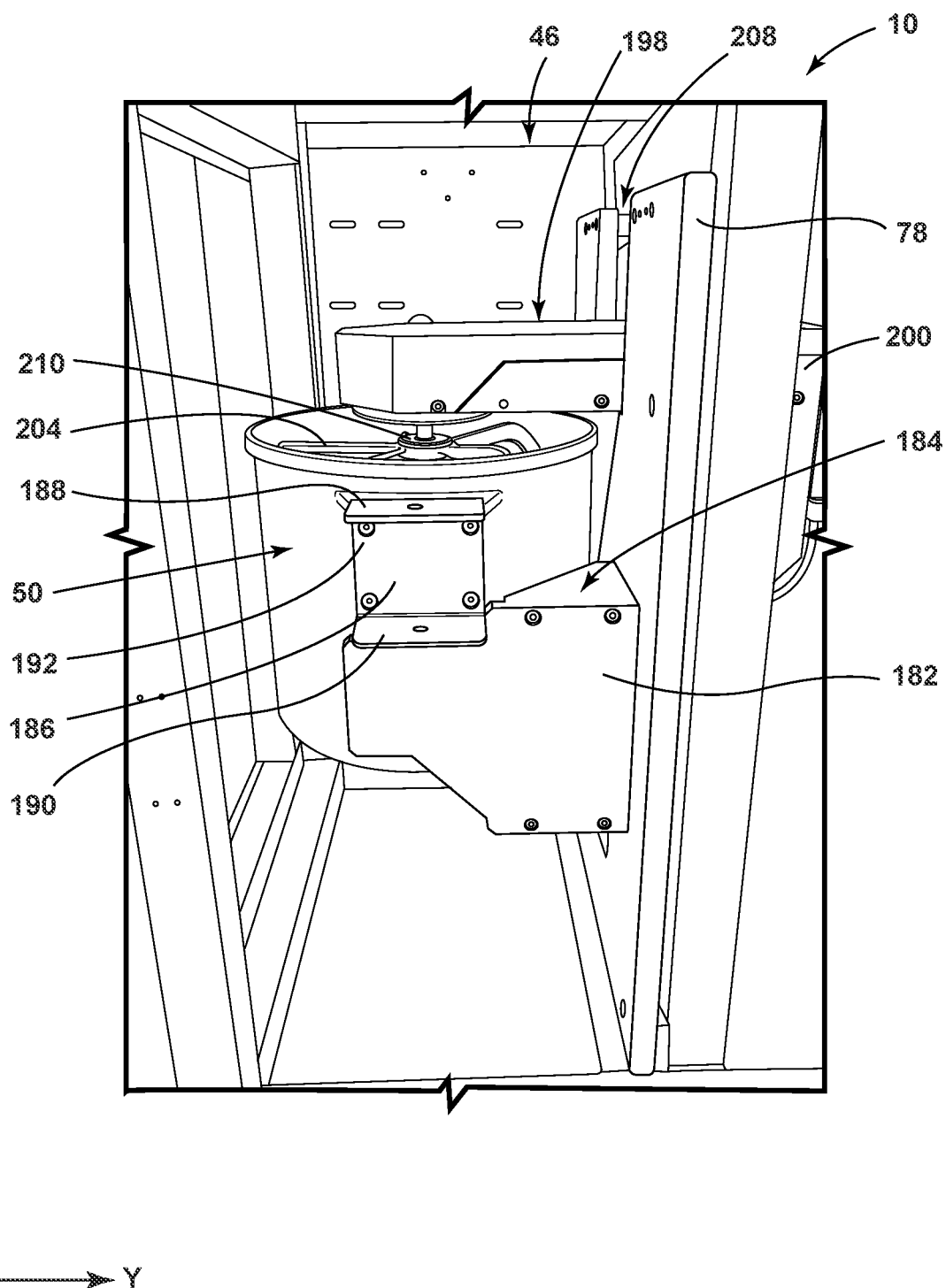
FIG. 7 is a side perspective view of a vessel of the material deposition assembly in accordance with various aspects of the present disclosure.
Figure 8:
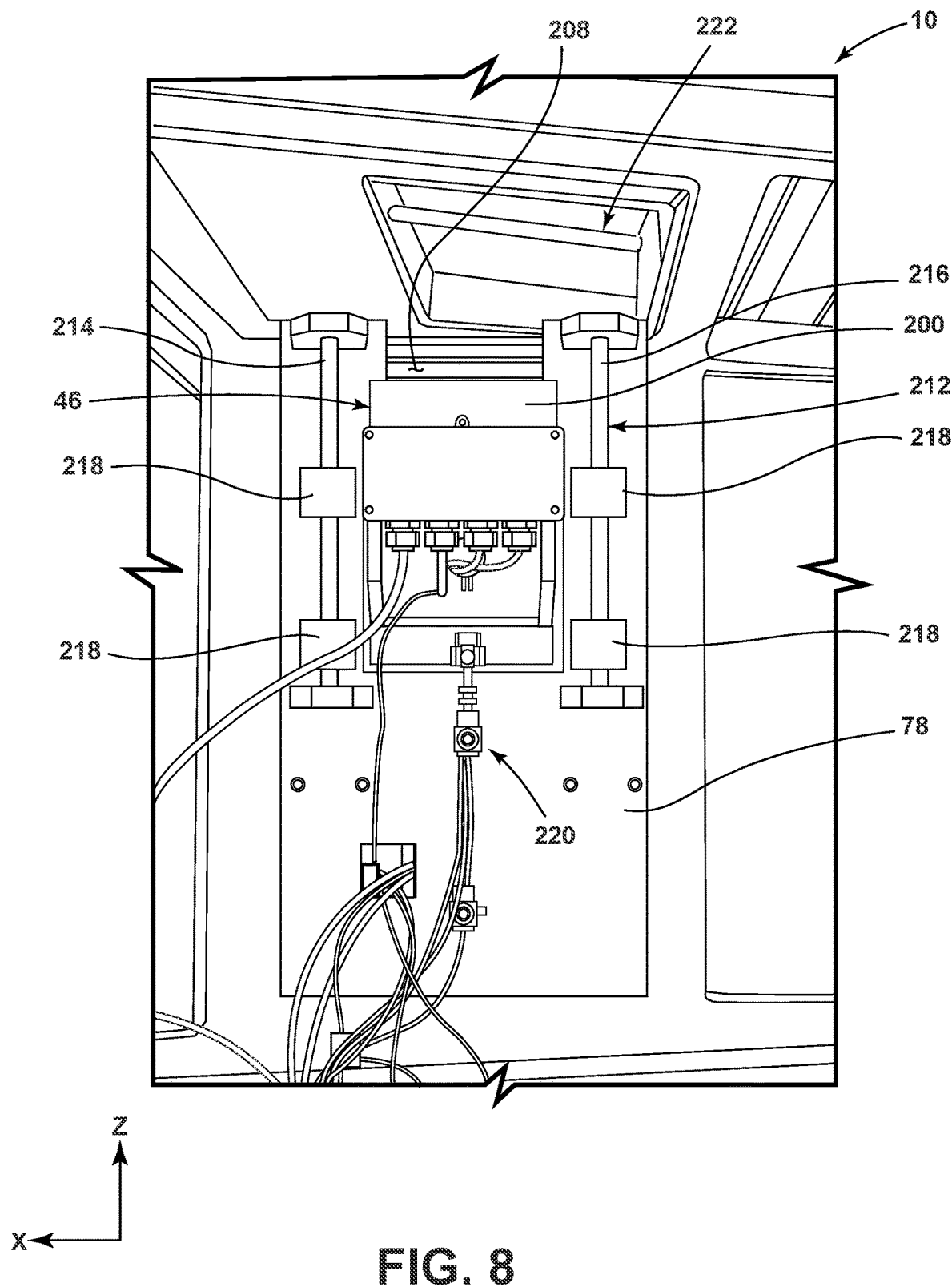
FIG. 8 is a rear perspective view of the material deposition assembly in accordance with various aspects of the present disclosure.

Referring to FIGS. 6-8, various views of the material deposition assembly 46 are exemplary illustrated in accordance with aspects of the present disclosure. As provided herein, the rotation assembly 202 is operably coupled with the impeller 204. In various embodiments, the material deposition assembly panel 78 may define a channel 208 and at least a portion of the rotation assembly 202 may extend through the channel 208 and to a position over the vessel 50. The rotation assembly 202 may include a coupler 210 that allows for the impeller 204 to be selectively coupled thereto.

In some embodiments, the rotation assembly 202 may be movable within the channel 208 generally in the Z-axis direction. In some examples, the rotation assembly 202 may be operably coupled with a track assembly 212 to guide movement in the Z-axis. As illustrated, the track assembly 212 may be operably coupled with a rear side of the material deposition assembly panel 78, and/or any other component of the apparatus 10.

In the illustrated embodiment, the track assembly 212 includes first and second rails 214, 216 positioned on opposing sides of the channel 208 of the material deposition assembly panel 78. The rotation assembly 202 includes guides 218 coupled with each of the first and second rails 214, 216. The guides 218 are configured to slide along each of the first and second rails 214, 216. In some examples, the track assembly 212 may include one or more retainers that are configured to retain the rotation assembly 202 in predefined positions along the first and second rails 214, 216.

Additionally or alternatively, in some instances, a movement device 220 may be operably coupled with rotation assembly 202 and configured to move the rotation assembly 202 along the track assembly 212 and/or retain the rotation assembly 202 in a position along the track assembly 212. For example, the movement device 220 provides upward vertical force through hydraulics, pneumatics, spring mechanics, actuator, and/or otherwise.

In some examples, the movement device 220 may include a pneumatic linear actuator that includes a body, a piston, and a slide or carriage that is operably coupled with the piston and the rotation assembly 202. The piston is moved by a fluid sent into a chamber that is present on both ends of the piston.

First and second valves may be fluidly coupled with the chamber that allows for fluid to be selectively provided to either side of the piston causing the piston to move in response. The movement of the piston also causes the slide to move, which, in turn, moves the rotation assembly 202. The first and second valves can also have flow control features to be able to adjust the speed at which the rotation assembly 202 is moved along the first and second rails 214, 216.

With further reference to FIG. 8, in some embodiments, an access may be positioned above the material deposition assembly 46 in the Z-axis direction. For example, the access may be a pane 222 that allows visibility of the vessel 50. The pane 222 may be configured to block UV light, and/or any other spectrum of light, from being able to pass therethrough. Furthermore, in various embodiments, the pane 222 may be moveable such that the material deposition assembly 46 may be accessible through the pane 222.

Referring now to FIGS. 9-12, views of a material deposition system in accordance with various aspects of the present disclosure are provided. In certain exemplary embodiments, the material deposition device may have various components that are configured in a generally common manner with the exemplary material deposition assembly 46 described above with reference to FIGS. 1-8. Accordingly, the same or similar numbers may refer to the same or similar parts.

In some embodiments, such as those illustrated in FIGS. 9-12, the vessel 50 may be offset from the reservoir 52 in the X-axis direction. As such, the conduit 54 extending between the vessel 50 and the reservoir 52 may be non-linear in the Z-axis direction. In various embodiments, a connector 224 may be operably coupled with the reservoir 52 to maintain the conduit 54 in a predefined orientation. The connector 224 may be integrally formed with the reservoir 52 and/or operably coupled therewith. The connector 224 may be configured to direct an end portion of the conduit 54 towards the cavity 152 of the reservoir 52.

With further reference to FIGS. 9-12, the regulator 174 may be coupled with the conduit 54. As provided herein, the regulator 174 is configured to restrict flow of the resin R from the vessel 50 to the reservoir 52 in a first position and allow flow from the vessel 50 to the reservoir 52 in a second position. In some embodiments, the regulator 174 may be configured as a pneumatically actuated pinch valve. In various embodiments, suitable control of the regulator 174 can be accomplished through activation of an electrical device, a pneumatic device, a sonic device, an electromagnetic device, a combination thereof, and/or any other practicable device.

As discussed above, the material deposition assembly 46 can further include a volume sensor 176. The volume sensor 176 can be configured to provide signals to the computing system 72 related to the first volume 136 of the resin R within the cavity 152 of the reservoir 52. The computing system 72 is configured to receive the monitoring signals and process such signals using predetermined algorithms to generate control signals for controlling the regulator 174. For instance, the computing system 72 can actuate the regulator 174 from the second position to the first position when the first volume 136 of the resin R is within a predefined range. In this manner, closed-loop control of the first volume 136 of the resin R can be achieved. Once the first volume 136 of the resin R returns to the predefined range, the computing system 72 can actuate the regulator 174 from the first position to the second position thereby blocking further flow of the resin R from the vessel 50 to the reservoir 52. The volume sensor 176 may be embodied as one or more imaging sensors or any other vision-based device. The volume sensor 176 may additionally and/or alternatively be configured as any other practicable proximity sensor, such as, but not limited to, an ultrasonic sensor, a radar sensor, a LIDAR sensor, or the like.

In some embodiments, the actuation of the regulator 174 may additionally or alternatively be based on any other input. For example, the volume of the resin R transferred from the vessel 50 to the reservoir 52 may be at least partially based on the thickness sensor 170, the volume of resin support 28 translated through the reservoir 52, and/or any other information.

In some examples, the restrictor 178 may also be operably coupled with the conduit 54 and configured to block flow of the resin R past the restrictor 178 when placed in a restricted position. Conversely, when placed in a flow position, the restrictor 178 may allow the resin R to flow past the restrictor 178. In some examples, the restrictor 178 may be manually moved between the blocked position and the flow position through a handle 180. However, the restrictor 178 may be moved between positions in any other manner without departing from the scope of the present disclosure.

With further reference to FIGS. 9-12, the rotation assembly 202 may include a transmission 226 in the form of a belt system but may also be configured as any other practicable system. In some cases, the transmission 226 may be operably coupled with a transmission plate 228. In some instances, a first pulley 230 may be operably coupled the transmission plate 228 and an actuator 232. A second pully 234 may be coupled with the impeller 204. A belt 236 or other energy transferring device may be positioned about the first and second pulleys 230, 234 to transfer energy from the actuator 232 to the impeller 204.

In some instances, a housing 200 may at least partially surround the transmission 226 plate and/or the movement device 220. In addition, the housing 200 (or the transmission plate 228) may be operably coupled with the track assembly 212 to allow for movement of the transmission plate 228 along the Z-axis direction. Additionally, in some instances, a movement device 220 may be operably coupled with rotation assembly 202 and configured to move the rotation assembly 202 along the track assembly 212 and/or maintain the rotation assembly 202 in a position along the track assembly 212. For example, the movement device 220 provides upward vertical force through hydraulics, pneumatics, spring mechanics, actuator, and/or otherwise.

With further reference to FIGS. 9-12, in some embodiments, the impeller 204 may be configured as a pitched, or double-pitched, blade impeller. Moreover, the impeller 204 may include any number of blades. For example, as illustrated, the impeller 204 may include three blades. The pitched impellers may induce a top-to-bottom turnover of the resin R and circulate the resin R without excessive swirling.

Figure 13:
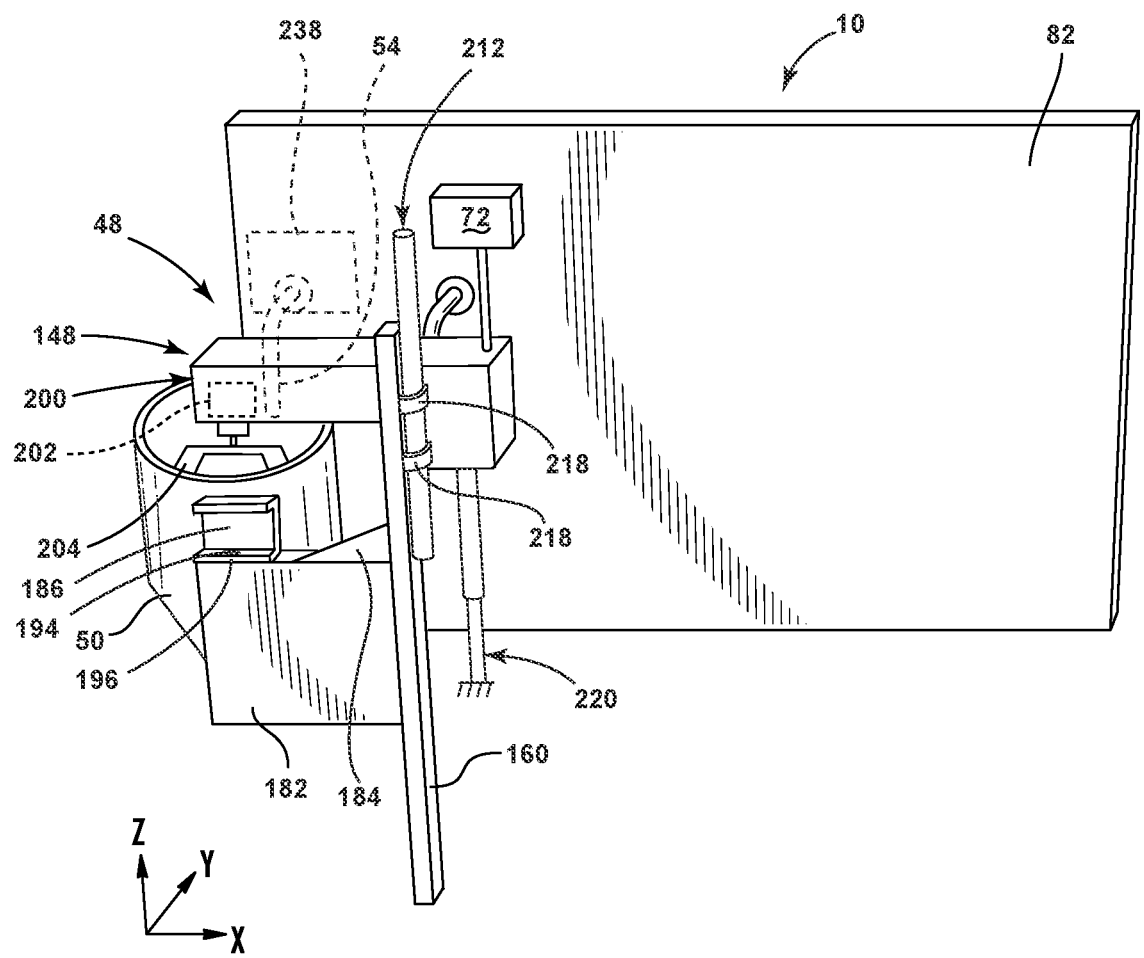
FIG. 13 is a rear perspective view of a reclamation system including the vessel in accordance with various aspects of the present disclosure.

Referring now to FIG. 13, a view of a reclamation system 48 within the resin management system 44 in accordance with various aspects of the present disclosure is provided. In certain exemplary embodiments, the reclamation system 48 may be configured to include various components that are generally common with the exemplary material deposition assemblies described above with reference to FIGS. 1 through 12. Accordingly, the same or similar numbers may refer to the same or similar parts.

In some embodiments, the reclamation system 48 may include a collection structure 238 that is configured to remove at least a portion of the resin R from the resin support 28. As the resin R is removed by the collection structure 238, the resin R is directed through a conduit 54 and into a vessel 50. In some examples, the collection structure 238 is supported by and positioned on a first side 114 of the take-up panel 102 and the vessel 50 is positioned on an opposing second side 118 of the take-up panel 102.

Figure 14:
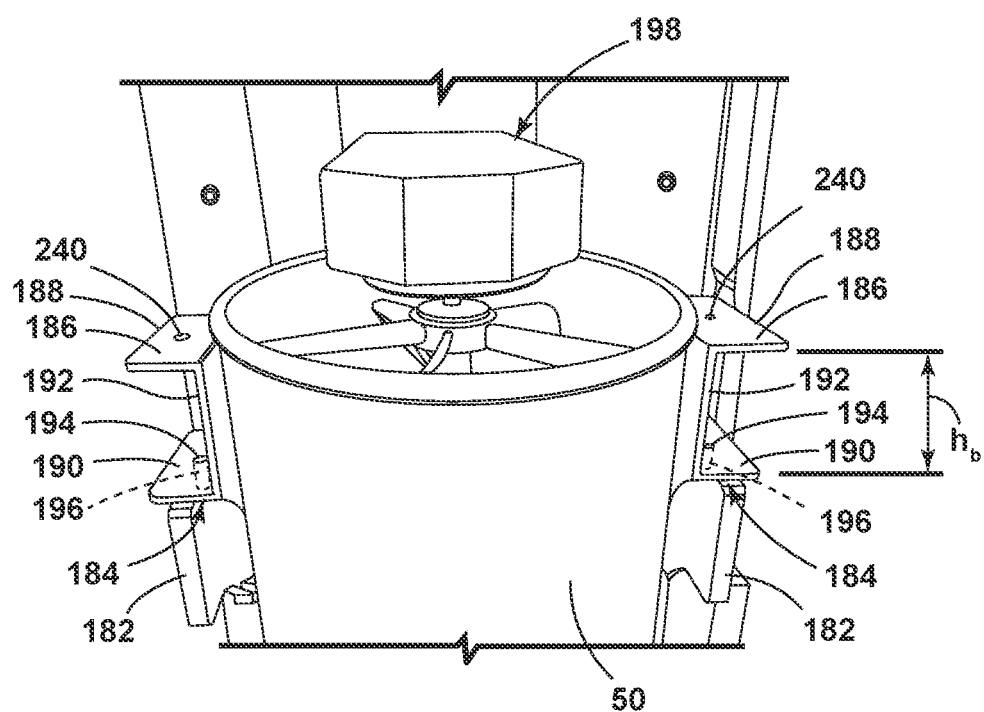
FIG. 14 is a front perspective view of the material deposition assembly in accordance with various aspects of the present disclosure.

With further reference to FIGS. 13 and 14, the vessel 50 may be suspended by a reinforcement and/or a brace 182. In some instances, a mixing assembly 198 may be configured to continuously and/or intermittently agitate the resin R within the vessel 50 to generally maintain the consistency and quality of the resin R. As illustrated, in some embodiments, the mixing assembly 198 may include a housing 200 operably coupled with the reinforcement. The housing 200 supports a rotation assembly 202 capable of rotating an impeller 204 that extends into the vessel 50. The mixing assembly 198 may allow for the resin R to be continually agitated to prevent excessive settling or separation of the resin R.

As discussed above, the vessel 50 may include a bracket 186 that is operably coupled with the brace 182 to maintain the vessel 50 in a predefined location. The bracket 186 may be of any practicable geometry. In some embodiments, such as the one illustrated in FIG. 13, the bracket 186 may include an upper portion 188, a lower portion 190, and a body portion 192 extending between the upper portion 188 and the lower portion 190.

In some instances, the brace 182 may include a brace locating pin 194. The lower portion 190 of the bracket 186 may include a first locating void 196 that is configured to at least partially surround the brace locating pin 194. As such, the bucket may be placed in a generally consistent location within the reclamation system 48.

In the illustrated embodiment, the reclamation system 48 may also include a track assembly 212. The housing 200 can include guides 218 coupled with each of the rails 214. The guides 218 are configured to slide along each of the rails 214. In some examples, the track assembly 212 may include one or more retainers that are configured to retain the rotation assembly 202 in predefined positions along the rails 214. Additionally or alternatively, in some instances, a movement device 220 may be operably coupled with rotation assembly 202 and configured to move the rotation assembly 202 along the track assembly 212 and/or maintain the rotation assembly 202 in a position along the track assembly 212. For example, the movement device 220 provides upward vertical force through hydraulics, pneumatics, spring mechanics, actuator, and/or otherwise.

Figure 15:
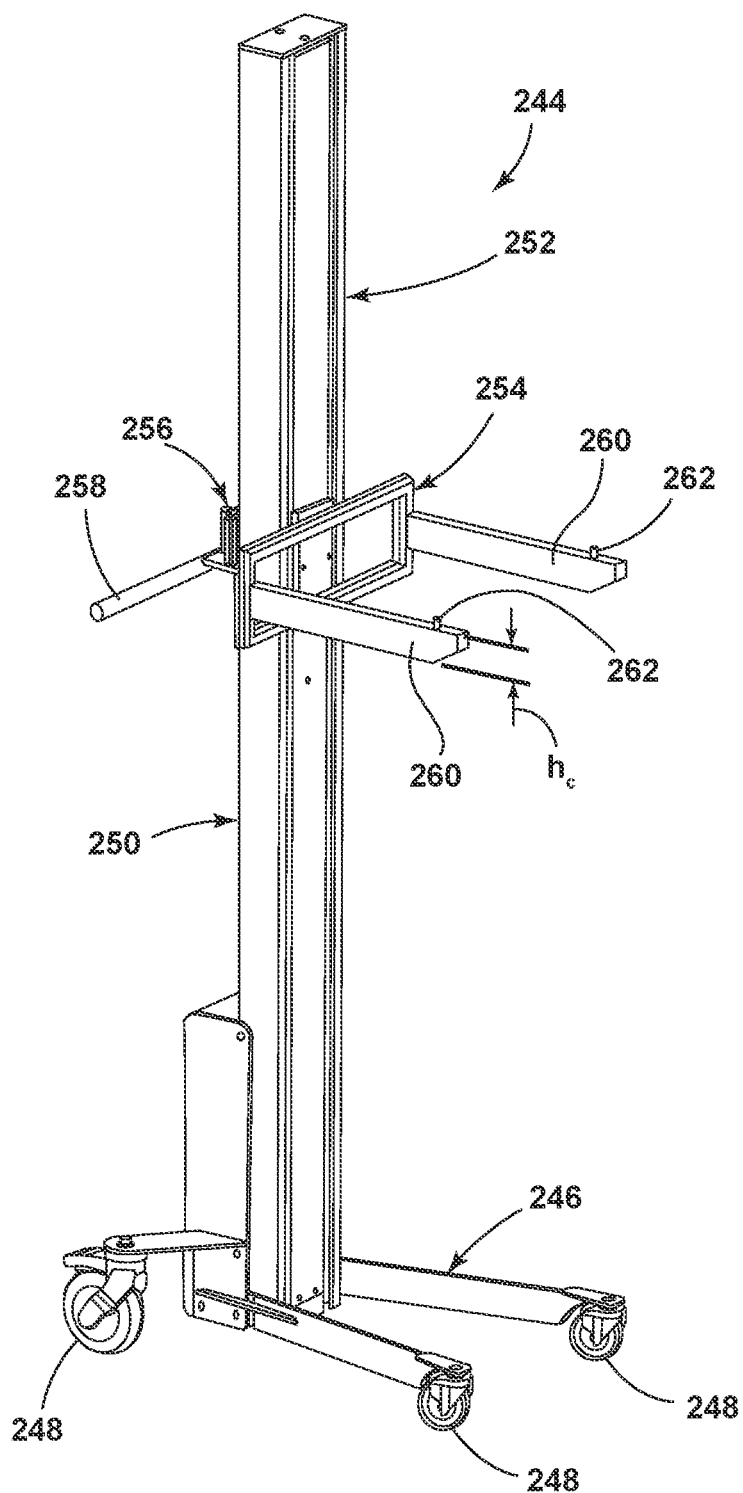
FIG. 15 is a side perspective view of a dolly for moving the vessel in accordance with various aspects of the present disclosure.
Figure 16:
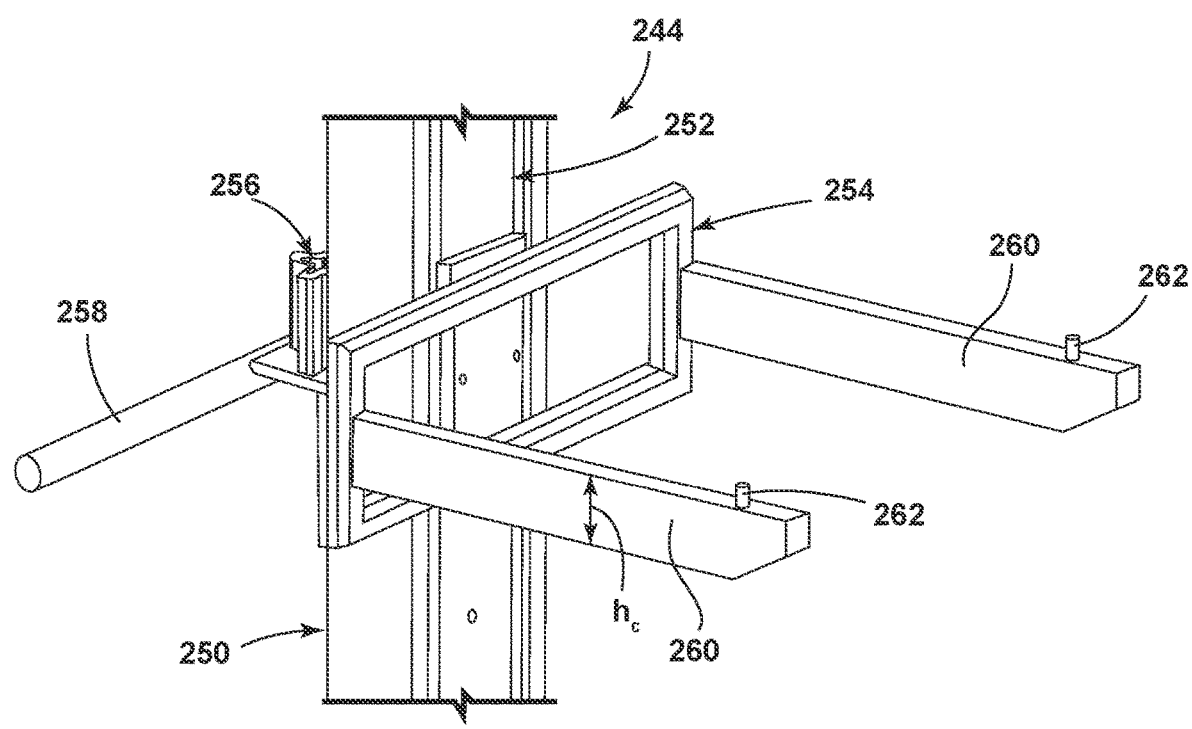
FIG. 16 is a side perspective view of a carrier of the dolly in accordance with various aspects of the present disclosure.

Referring now to FIGS. 14-16, in some instances, the bracket 186 of vessel 50 of the material deposition assembly 46 and the bracket 186 of the vessel 50 of the reclamation system 48 may be generally of the same configuration. For example, as provided herein, the lower portion 190 of each bracket 186 may include a first locating void 196 that is configured to at least partially surround a brace locating pin 194 of the brace 182 within the material deposition assembly 46 and/or the reclamation system 48. In addition, each of the upper portions 188 of the brackets 186 may also define a second locating void 240. The second locating voids 240 of the upper portions 188 may be of a similar size or geometry to that of the first locating voids 196 of the lower portions 190. Alternatively, the second locating voids 240 of the upper portions 188 may be of a different size or geometry to that of the location voids of the lower portions 190.

Referring still to FIGS. 14-16, in various embodiments, due to a common geometry of the bracket 186 of the vessel 50 of the material deposition assembly 46 and the bracket 186 of the vessel 50 of the reclamation system 48, a common dolly 244 may be used to place the vessels 50 within and/or remove the vessels 50 from the apparatus 10 (FIG. 1). For example, the dolly 244 may include a base portion 246 that includes one or more movement assemblies 248, such as wheels, rollers, and the like. A beam 250 may extend from the base portion 246. The beam 250 may include a slide assembly 252 that allows for a carrier 254 to slide along the beam 250. In some examples, the slide assembly 252 may include one or more retainers that are configured to retain the carrier 254 in predefined positions along the slide assembly 252.

Additionally or alternatively, in some instances, a movement device 256 may be operably coupled with the carrier 254 and configured to move the carrier 254 along the slide assembly 252 and/or maintain the carrier 254 in a position along the slide assembly 252. For example, the movement device 256 provides upward vertical force through an actuator (e.g., electric) hydraulics, pneumatics, spring mechanics, and/or otherwise.

In various embodiments, the dolly 244 may further include an input device 258 for altering the position of the carrier 254 along the slide assembly 252. For example, as illustrated in FIGS. 15 and 16, the input device 258 may be in the form of a lever that allows for selective movement of the carrier 254.

Referring back to FIGS. 14-16, in several embodiments, the carrier 254 includes a pair of arms 260. Each of the arms 260 may be of a height $h_c$ that is less than a height $h_b$ defined between the upper portion 188 and the lower portion 190 of each bracket 186. As such, the arms 260 may be slid between the upper portion 188 and the lower portion 190 of each bracket 186. Furthermore, the first arm 260 of the carrier 254 may be separated from the second arm 260 of the carrier 254 by a width that is greater than the width defined by the vessel 50 and the opposing body portions 192 of the brackets 186 installed on a common vessel 50. Thus, in some embodiments, the carrier 254 may be positioned within the channels defined by the brackets 186 on the opposing sides of the vessel 50. To make insertion of the first and second arms 260 into the respective channels of the brackets 186, the an outer end portion of each arm 260 may be chamfered.

In several embodiments, each arm 260 may also define a carrier locating pin 262 on an upper surface thereof. The carrier locating pin 262 on each arm 260 may be surrounded by the second locating void 240 on the upper portion 188 of each bracket 186. As such, the first locating void 196 in the lower portion 190 of each bracket 186 may surround a brace carrier locating pin 262 when installed within the apparatus 10 and the second locating void 240 of the upper portion 188 of each bracket 186 may surround a carrier locating pin 262 on the carrier 254 when transported by the dolly 244.

Figure 17:
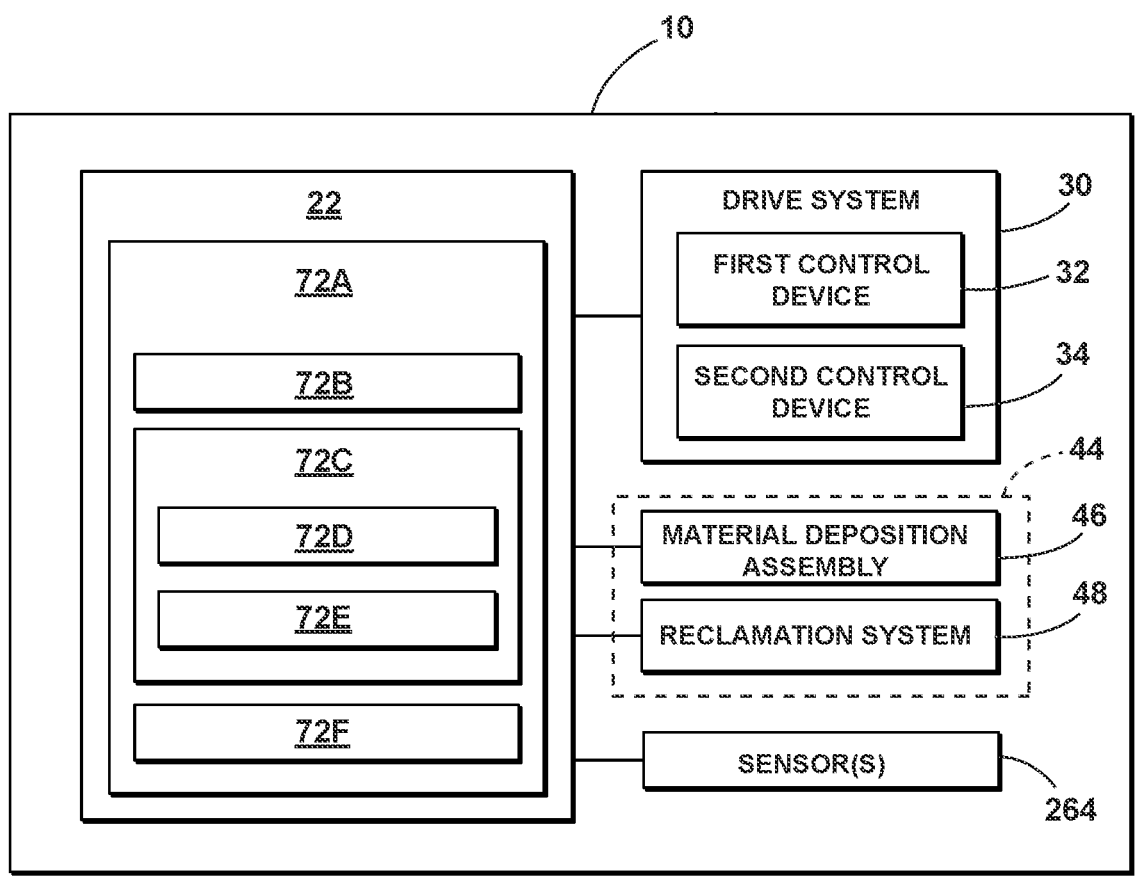
FIG. 17 depicts an exemplary computing system for an additive manufacturing apparatus in accordance with various aspects of the present disclosure.

FIG. 17 depicts certain components of the computing system 72 according to example embodiments of the present disclosure. The computing system 72 can include one or more computing device(s) 72A which may be used to implement the method 300 such as described herein. The computing device(s) 72A can include one or more processor(s) 72B and one or more memory device(s) 72C. The one or more processor(s) 72B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 72C can include one or more non-transitory computer-readable storage medium(s), such as RAM, ROM, EEPROM, EPROM, flash memory devices, magnetic disks, etc., and/or combinations thereof.

The memory device(s) 72C can include one or more computer-readable media and can store information accessible by the one or more processor(s) 72B, including instructions 72D that can be executed by the one or more processor(s) 72B. The instructions 72D may include one or more steps of the method 300 described herein, such as to execute operations of the additive manufacturing apparatus 10 described above. For instance, the memory device(s) 72C can store instructions 72D for running one or more software applications, displaying a user interface, receiving user input, processing user input, etc. In some implementations, the instructions 72D can be executed by the one or more processor(s) 72B to cause the one or more processor(s) 72B to perform operations, e.g., such as one or more portions of methods described herein. The instructions 72D can be software written in any suitable programming language or can be implemented in hardware. Additionally, and/or alternatively, the instructions 72D can be executed in logically and/or virtually separate threads on processor(s) 72B.

The one or more memory device(s) 72C can also store data 72E that can be retrieved, manipulated, created, or stored by the one or more processor(s) 72B. The data 72E can include, for instance, data to facilitate performance of the method 300 described herein. The data 72E can be stored in one or more database(s). The one or more database(s) can be connected to computing system 72 by a high bandwidth LAN or WAN, or can also be connected to the computing system 72 through network(s) (not shown). The one or more database(s) can be split up so that they are located in multiple locales. In some implementations, the data 72E can be received from another device.

The computing device(s) 72A can also include a communication module or interface 72F used to communicate with one or more other component(s) of computing system 72 or the additive manufacturing apparatus 10 over the network(s). The communication interface 72F can include any suitable components for interfacing with one or more network(s), including, for example, transmitters, receivers, ports, controllers, antennas, or other suitable components.

As provided herein, the computing system 72 may be operably coupled with one or more of the drive system 30, the material deposition assembly 46, and/or the reclamation system 48. The computing system 72 may be configured to control the actuation of the drive system 30 based on the information from one or more sensors 264. Likewise, the computing system 72 may be operably coupled with the material deposition assembly 46 and/or the reclamation system 48 to actuate one or more respective components thereof.

Figure 18:
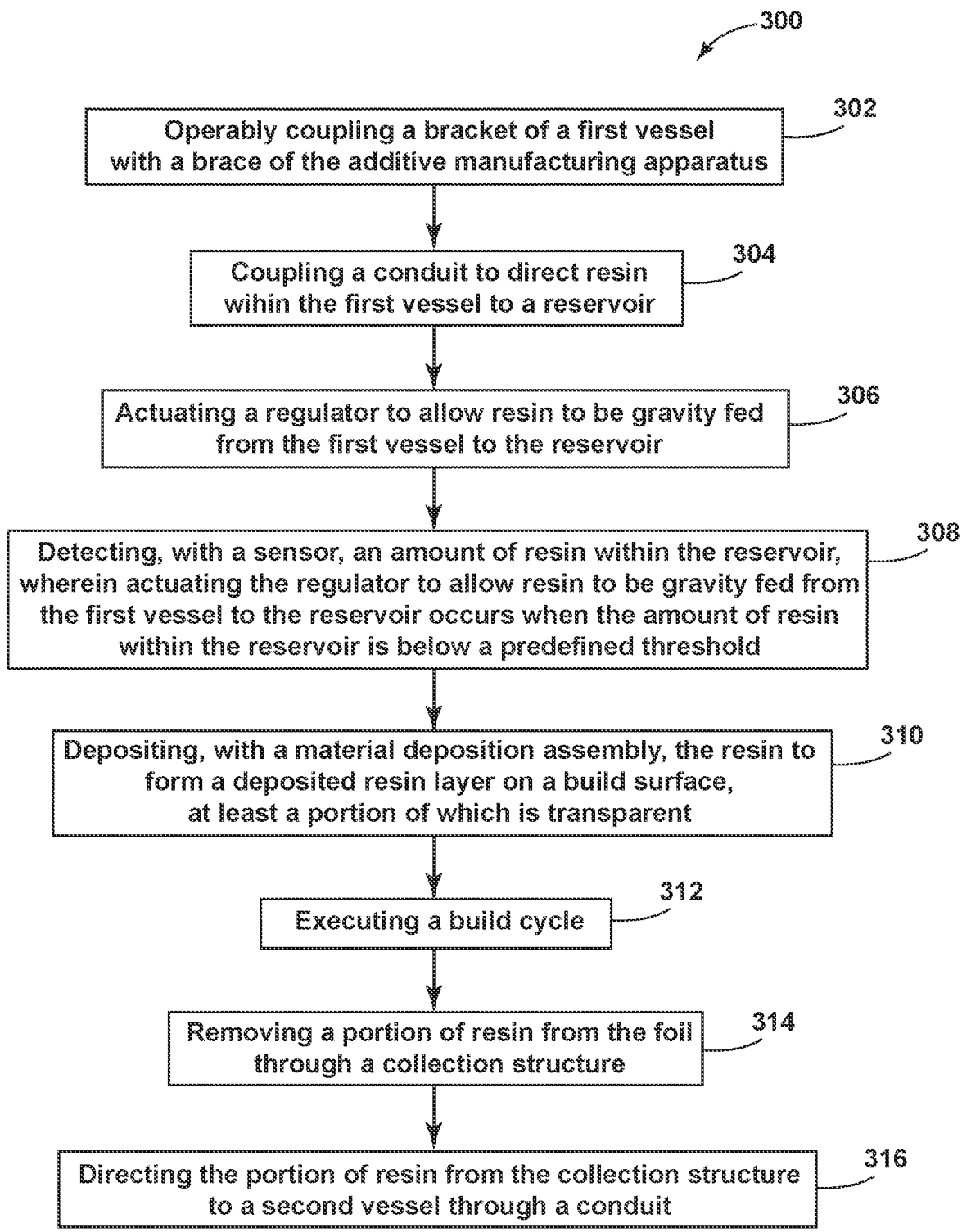
FIG. 18 is a method of operating the manufacturing apparatus in accordance with various aspects of the present disclosure.

Now that the construction and configuration of the additive manufacturing apparatus having one or more accumulators have been described according to various examples of the present subject matter, a method 300 for operating an additive manufacturing apparatus is provided. In general, the method 300 will be described herein with reference to the additive manufacturing apparatus shown in FIGS. 1-16 and the various system components shown in FIG. 17. However, it will be appreciated that the disclosed method 300 may be implemented with additive manufacturing apparatuses having any other suitable configurations and/or within systems having any other suitable system configuration. In addition, although FIG. 18 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring now to FIG. 18, at step 302, the method 300 includes operably coupling a bracket of a first vessel with a brace of said additive manufacturing apparatus. As provided herein, the brace may be operably coupled with a frame of the manufacturing apparatus and the bracket may be coupled with the first vessel. Further, the bracket can define an upper support and a lower support with the lower support positioned above the brace in the Z-axis direction. In some instances, the brace can define a locator pin and the lower support can define a locating void. In such instances, operably coupling a bracket of a first vessel with a brace may include positioning the locating void of the bracket about the locator pin of the brace.

Next, at step 304, the method 300 includes coupling a conduit to direct resin within the first vessel to a reservoir. The reservoir can be configured to retain a first volume of the resin therein and define a thickness of the resin on the resin support as the resin support is translated in an X-axis direction. The vessel can be positioned above the reservoir in a Z-axis direction and configured to store a second volume of the resin.

At step 306, the method 300 includes actuating a regulator to allow the resin to be gravity fed from the first vessel to the reservoir. At step 308, the method 300 can include detecting, with a sensor, a first volume of the resin within the reservoir. The regulator may be actuated when the first volume of the resin is below a predefined range. In various embodiments, the resin may be gravity fed from the first vessel to the reservoir to generally prevent the introduction of air to the resin R as the air is transferred into and/or through the conduit to the reservoir.

At step 310, the method 300 includes depositing, with a material deposition assembly, the resin to form a deposited resin layer on a resin surface. In various instances, the resin surface can include at least a portion that is transparent. The material deposition assembly may be any device or combination of devices that is operable to apply a layer of the resin on the resin support. The material deposition assembly may optionally include a device or combination of devices to define a height of the resin on the resin support and/or to level the resin on the resin support. Nonlimiting examples of suitable material deposition assemblies include chutes, hoppers, pumps, spray nozzles, spray bars, or printheads (e.g. inkjets).

At step 312, the method 300 includes executing a build cycle. In various embodiments, the build cycle can include positioning a stage relative to the resin surface so as to define a layer increment in the deposited resin layer, selectively curing the resin using an application of radiant energy in a specific pattern so as to define the geometry of a cross-sectional layer of the component, and/or moving the resin surface and the stage relatively apart so as to separate the component from the resin surface.

At step 314, the method 300 can include removing a portion of the resin from the resin support through a collection structure. Moreover, at step 316, the method can include directing the portion of the resin from the collection structure to a second vessel through a conduit.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt-based superalloys (e.g., those available under the name Inconel® available from Special Metals Corporation). These materials are examples of materials suitable for use in the additive manufacturing processes described herein, and may be generally referred to as "additive materials."

Further aspects are provided by the subject matter of the following clauses:

An additive manufacturing apparatus comprising: a stage configured to hold a component; a radiant energy device operable to generate and project radiant energy in a patterned image; an actuator configured to change a relative position of the stage relative to the radiant energy device; and a resin management system including a material deposition assembly upstream of the stage and configured to deposit a resin on a resin support, the material deposition assembly comprising: a reservoir configured to retain a first volume of the resin; a vessel separated from the reservoir and configured to store a second volume of the resin; and an impeller positioned within the vessel and configured to agitate the resin within the vessel.

The additive manufacturing apparatus of one or more of these clauses, wherein the reservoir is configured to define a thickness of the resin on the resin support as the resin support is translated in an X-axis direction and a conduit configured to direct the resin from the vessel to the reservoir.

The additive manufacturing apparatus of one or more of these clauses, wherein the reservoir includes an upstream wall, a downstream wall, and sidewalls that define a cavity, and wherein the conduit is configured to direct resin into the cavity.

The additive manufacturing apparatus of one or more of these clauses, wherein the upstream wall defines a slot to receive the resin support and the downstream wall defines an aperture that serves as an outlet for the resin support and a layer of the resin deposited on the resin support.

The additive manufacturing apparatus of one or more of these clauses, wherein the material deposition assembly further comprises a regulator operably coupled with the conduit, the regulator configured to restrict flow of the resin from the vessel to the reservoir in a first position and allow flow from the vessel to the reservoir in a second position.

The additive manufacturing apparatus of one or more of these clauses, further comprising: a computing system operably coupled with the regulator and a volume sensor, the volume sensor configured to provide data to the computing system related to the first volume of the resin, and wherein the computing system actuates the regulator from the second position to the first position when the first volume of the resin deviates from a predefined range.

The additive manufacturing apparatus of one or more of these clauses, wherein the material deposition assembly further comprises a connector coupled with the upstream wall, the connector configured to maintain a portion of the conduit in a predefined position.

The additive manufacturing apparatus of one or more of these clauses, wherein the impeller is operably coupled with a rotation assembly, and wherein the rotation assembly is translatable in a Z-axis direction along a track assembly.

The additive manufacturing apparatus of one or more of these clauses, further comprising: a brace operably coupled with a frame of said manufacturing apparatus, wherein the material deposition assembly further comprises a bracket coupled with the vessel, the bracket selectively coupled with the brace.

The additive manufacturing apparatus of one or more of these clauses, wherein the bracket defines an upper support and a lower support, and wherein the lower support is positioned above the brace in a Z-axis direction.

The additive manufacturing apparatus of one or more of these clauses, wherein the brace defines a locator pin and the lower support defines a locating void, and wherein the locating void configured to surround the locator pin.

A method of operating an additive manufacturing apparatus, the method comprising: operably coupling a bracket of a first vessel with a brace of said additive manufacturing apparatus; coupling a conduit to direct a resin within the first vessel to a reservoir; and actuating a regulator to allow the resin to be gravity fed from the first vessel to the reservoir.

The method of one or more of these clauses, further comprising: depositing, with a material deposition assembly, the resin to form a deposited resin layer on a resin surface, at least a portion of which is transparent.

The method of one or more of these clauses, further comprising: detecting, with a sensor, a volume of the resin within the reservoir, wherein actuating the regulator to allow the resin to be gravity fed from the first vessel to the reservoir occurs when the volume of the resin within the reservoir deviates from a predefined range.

The method of one or more of these clauses, further comprising: executing a build cycle, including the steps of: positioning a stage relative to a resin surface so as to define a layer increment in the resin; selectively curing the resin using an application of radiant energy in a specific pattern so as to define a cross-sectional layer of a component; and moving the resin surface and the stage relatively apart so as to separate the component from the resin surface.

The method of one or more of these clauses, further comprising: removing a portion of the resin from a resin support through a collection structure; and directing the portion of the resin from the collection structure to a second vessel through the conduit.

An additive manufacturing apparatus comprising: a stage configured to hold one or more cured layers of a resin that form a component; a radiant energy device positioned opposite to the stage such that it is operable to generate and project radiant energy in a patterned image; and a resin management system including a reclamation system downstream of the stage, the reclamation system comprising: a collection structure configured to remove at least a portion of the resin from a resin support; a vessel configured to retain the resin removed from the resin support; and an impeller positioned within the vessel and configured to agitate the resin within the vessel.

The additive manufacturing apparatus of one or more of these clauses, further comprising: first and second brackets operably coupled with opposite sides of the vessel.

The additive manufacturing apparatus of one or more of these clauses, further comprising: a first brace and a second brace each defining a locating pin, wherein the first and second brackets define locating voids that are configured to respectively surround the locating pin of the first brace and the locating pin of the second brace.

The additive manufacturing apparatus of one or more of these clauses, wherein the first and second brackets define locating voids that are configured to respectively surround locating pins of a carrier of a dolly.

This written description uses examples to disclose the concepts presented herein, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. An additive manufacturing apparatus comprising:
a stage configured to hold a component;
a radiant energy device operable to generate and project radiant energy in a patterned image;
an actuator configured to change a relative position of the stage relative to the radiant energy device;
a resin management system including a material deposition assembly upstream of the stage and configured to deposit a resin on a resin support, the material deposition assembly comprising:
a reservoir configured to retain a first volume of the resin;
a vessel separated from the reservoir and configured to store a second volume of the resin; and
an impeller positioned within the vessel and configured to agitate the resin within the vessel; and
a brace operably coupled with a frame of said manufacturing apparatus, wherein the material deposition assembly further comprises a bracket coupled with the vessel, the bracket selectively coupled with the brace.

2. The additive manufacturing apparatus of claim 1, further comprising:
 a conduit configured to direct the resin from the vessel to the reservoir.

3. The additive manufacturing apparatus of claim 2, wherein the reservoir includes an upstream wall, a downstream wall, and sidewalls that define a cavity, and wherein the conduit is configured to direct resin into the cavity.

4. The additive manufacturing apparatus of claim 3, wherein the upstream wall defines a slot to receive the resin support and the downstream wall defines an aperture that serves as an outlet for the resin support and a layer of the resin deposited on the resin support.

5. The additive manufacturing apparatus of claim 2, wherein the material deposition assembly further comprises a regulator operably coupled with the conduit, the regulator configured to restrict flow of the resin from the vessel to the reservoir in a first position and allow flow from the vessel to the reservoir in a second position.

6. The additive manufacturing apparatus of claim 5, further comprising:
 a computing system operably coupled with the regulator and a volume sensor, the volume sensor configured to provide data to the computing system related to the first volume of the resin, and wherein the computing system actuates the regulator from the second position to the first position when the first volume of the resin deviates from a predefined range.

7. The additive manufacturing apparatus of claim 3, wherein the material deposition assembly further comprises a connector coupled with the upstream wall, the connector further configured to operably coupled with a portion of the conduit.

8. The additive manufacturing apparatus of claim 1, wherein the impeller is operably coupled with a rotation assembly, and wherein the rotation assembly is translatable in a Z-axis direction along a track assembly.

9. The additive manufacturing apparatus of claim 1, wherein the bracket defines an upper support and a lower support, and wherein the lower support is positioned above the brace in a Z-axis direction.

10. The additive manufacturing apparatus of claim 9, wherein the brace defines a locator pin and the lower support defines a locating void, and wherein the locating void configured to surround the locator pin.

11. The additive manufacturing apparatus of claim 1, wherein the reservoir is configured to define a thickness of the resin on the resin support as the resin support is translated in an X-axis direction.

* * * * *